US008649053B2

(12) United States Patent
Shigeta et al.

(10) Patent No.: US 8,649,053 B2
(45) Date of Patent: Feb. 11, 2014

(54) PRINTING RELIEF PLATE PRODUCING APPARATUS, SYSTEM, METHOD, AND RECORDING MEDIUM

(75) Inventors: Norimasa Shigeta, Kanagawa-ken (JP); Osamu Shimazaki, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 336 days.

(21) Appl. No.: 13/090,019

(22) Filed: Apr. 19, 2011

(65) Prior Publication Data

US 2011/0255134 A1 Oct. 20, 2011

(30) Foreign Application Priority Data

Apr. 20, 2010 (JP) ................................ 2010-097199

(51) Int. Cl.
*H04N 1/405* (2006.01)

(52) U.S. Cl.
USPC ........................................... 358/1.7; 358/468

(58) Field of Classification Search
USPC .......... 358/3.32, 1.9, 2.1, 1.7, 3.06, 3.1, 500, 358/400, 468
See application file for complete search history.

(56) References Cited

U.S. PATENT DOCUMENTS 4,046,071 A * 9/1977 Mizuno et al. ................ 101/395
4,101,324 A * 7/1978 Mizuno et al. ................ 430/306

FOREIGN PATENT DOCUMENTS

JP 2006-95931 A 4/2006
JP 2007-185917 A 7/2007
JP 2008-183888 A 8/2008
JP 2008-230195 A 10/2008

* cited by examiner

*Primary Examiner* — Thomas D Lee
*Assistant Examiner* — Stephen M Brinich
(74) *Attorney, Agent, or Firm* — Birch, Stewart, Kolasch & Birch, LLP

(57) ABSTRACT

Height conversion matrices for determining heights of halftone dot convexities are generated based on raster image data. Based on the height conversion matrices and binary image data, amount-of-exposure data are generated in order to produce a printing relief plate in which the halftone dot convexities have heights at a plurality of height levels in a screen tint region, which is formed based on the binary image data. Based on the amount-of-exposure data, a printing plate material is exposed to a light beam, thereby producing a printing relief plate.

19 Claims, 22 Drawing Sheets

FIG. 5A

| | | | | | | | |
|---|---|---|---|---|---|---|---|
| 40 | 40 | 40 | 40 | 40 | 40 | 40 | 40 |
| 40 | 40 | 40 | 40 | 40 | 40 | 40 | 40 |
| 40 | 40 | 40 | 40 | 40 | 40 | 40 | 40 |
| 40 | 40 | 40 | 40 | 40 | 40 | 40 | 40 |
| 40 | 40 | 40 | 40 | 40 | 40 | 40 | 40 |
| 40 | 40 | 40 | 40 | 40 | 40 | 40 | 40 |
| 40 | 40 | 40 | 40 | 40 | 40 | 40 | 40 |
| 40 | 40 | 40 | 40 | 40 | 40 | 40 | 40 |

Mh1

FIG. 5B

| | | | | | | | |
|---|---|---|---|---|---|---|---|
| 20 | 20 | 20 | 20 | 20 | 20 | 20 | 20 |
| 20 | 20 | 20 | 20 | 20 | 20 | 20 | 20 |
| 20 | 20 | 20 | 20 | 20 | 20 | 20 | 20 |
| 20 | 20 | 20 | 20 | 20 | 20 | 20 | 20 |
| 20 | 20 | 20 | 20 | 10 | 10 | 10 | 10 |
| 20 | 20 | 20 | 20 | 10 | 10 | 10 | 10 |
| 20 | 20 | 20 | 20 | 10 | 10 | 10 | 10 |
| 20 | 20 | 20 | 20 | 10 | 10 | 10 | 10 |

Mh5

FIG. 5C

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Mh100

FIG. 17

| | DETERMINING TYPE | IMAGE DETERMINING PROCESS 1 | IMAGE DETERMINING PROCESS 2 | IMAGE DETERMINING PROCESS 3 |
|---|---|---|---|---|
| DETERMINING METHOD | ARITHMETIC RANGE | SMALL SIZE (3×3 PIXELS) | MIDDLE SIZE (7×7 PIXELS) | LARGE SIZE (15×15 PIXELS) |
| | ARITHMETIC PROCESS | AVERAGE PIXEL VALUE IS CALCULATED IN ARITHMETIC RANGE | COUNT PIXEL VALUES IN ARITHMETIC RANGE | COUNT PIXEL VALUES IN ARITHMETIC RANGE |
| | DETERMINING CONDITIONS | IS DIFFERENCE BETWEEN PIXEL VALUE OF TARGET PIXEL AND AVERAGE PIXEL VALUE EQUAL TO OR GREATER THAN THRESHOLD ? | IS THE NUMBER OF PIXELS WHOSE PIXEL VALUE IS 1 EQUAL TO OR SMALLER THAN THRESHOLD ? | IS THE NUMBER OF PIXELS WHOSE PIXEL VALUE IS 1 EQUAL TO OR SMALLER THAN THRESHOLD ? |
| EXTRACTING CONDITIONS | ISOLATED SMALL-DOT IMAGE | YES | YES | YES |
| | NEAR-SOLID-AREA SMALL-DOT IMAGE | YES | NO | NO |
| | IN-CHARACTER SMALL-DOT IMAGE | YES | NO | YES |
| | OTHERS | YES | YES | NO |
| | | NO | YES/NO | YES/NO |

FIG. 18A
| | | | | |
|---|---|---|---|---|
| 1.0 | 1.0 | 1.0 | 1.0 | 1.0 |
| 1.0 | 0.8 | 0.5 | 0.8 | 1.0 |
| 1.0 | 0.5 | 0.0 | 0.5 | 1.0 |
| 1.0 | 0.8 | 0.5 | 0.8 | 1.0 |
| 1.0 | 1.0 | 1.0 | 1.0 | 1.0 |
FIG. 18B
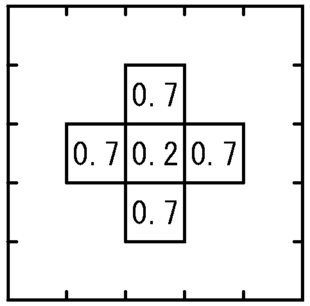
FIG. 18C
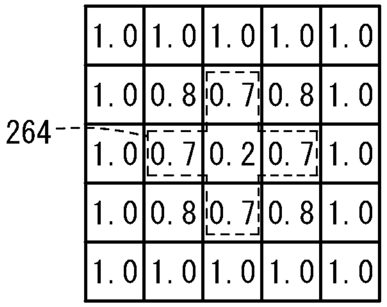

PRINTING RELIEF PLATE PRODUCING APPARATUS, SYSTEM, METHOD, AND RECORDING MEDIUM

CROSS-REFERENCE TO RELATED APPLICATION

This application is based upon and claims the benefit of priority from Japanese Patent Application No. 2010-097199 filed on Apr. 20, 2010, of which the contents are incorporated herein by reference.

BACKGROUND OF THE INVENTION

1. Field of the Invention

The present invention relates to a printing relief plate producing apparatus, a printing relief plate producing system, a printing relief plate producing method, and a recording medium for producing a printing relief plate having a plurality of halftone dot convexities for transferring an ink to a print medium to print halftone dots thereon.

2. Description of the Related Art

Heretofore, printing relief plates have been used in flexography, for example. As well known in the art, flexography uses elastic plate materials together with aqueous and UV inks. Since the plate materials are elastic, they lend themselves to printing on corrugated cardboard materials having surface irregularities.

Flexography has been problematic in that, since the used plate materials are elastic, halftone dots that are printed tend to be large in size, resulting in high dot gain and graininess (i.e., density fluctuations indicative of image coarseness).

Japanese Laid-Open Patent Publication No. 2008-230195 discloses a printing relief plate for printing on a can barrel. The disclosed printing relief plate has convexities the height of which is smaller than the height of a solid area of the printing relief plate. According to the publication, convexities that are lower than the solid area are less liable to be deformed when pressed by a blanket, and hence such convexities are effective at preventing dot gain from increasing.

Japanese Laid-Open Patent Publication No. 2008-183888 also discloses a printing relief plate for printing on a can barrel. The disclosed printing relief plate has convexities for printing halftone dots the halftone dot area ratio of which is equal to or smaller than a prescribed value. The height of the convexities becomes lower as the halftone dot area ratio is reduced. According to the publication, convexities for printing halftone dots, the halftone dot area ratio of which is small, bite into a blanket by a reduced distance, thereby reducing enlargement of the small halftone dots.

Japanese Laid-Open Patent Publication No. 2007-185917 discloses a flexographic printing plate including a halftone dot area the height of which is smaller than the height of a solid area of the printing relief plate by 0 μm to 500 μm, at a halftone dot area ratio equal to or greater than 5% and a halftone dot area ratio equal to or smaller than 40% on printed images. According to the publication, it is possible to produce a printing relief plate that exhibits excellent dot gain quality.

Japanese Laid-Open Patent Publication No. 2006-095931 discloses a platemaking method for generally shortening a platemaking time required to produce a printing relief plate for flexography, using laser beams having first and second beam diameters.

However, the printing relief plates disclosed in Japanese Laid-Open Patent Publication No. 2008-230195, Japanese Laid-Open Patent Publication No. 2008-183888, Japanese Laid-Open Patent Publication No. 2007-185917, and Japanese Laid-Open Patent Publication No. 2006-095931 pose certain problems related to engraving accuracy and print reproducibility, if the height (engraving lowering quantity) of the convexities for all of the halftone dots is changed altogether to a certain level at the same halftone dot area ratio.

The first problem is that, since the height of the convexities is constant for a screen tint region within a highlighted area, even a slight error from a target engraving quantity is liable to cause a printing density shift. For achieving stable printing density, therefore, it is necessary to maintain engraving accuracy for a target convexity height.

The second problem is concerned with a halftone dot printing failure. More specifically, as shown in FIG. 22A of the accompanying drawings, an engraved printing plate has a solid area 2 and lowered halftone dot convexities 4, 4*a*, 4*b*, which altogether are lower than the solid area 2 by a height hc. In a printing process, almost no printing pressure is applied to the lowered halftone dot convexities 4*a*, 4*b*, which are disposed in a boundary region between the solid area 2 and the lowered halftone dot convexities 4, 4*a*, 4*b*. Therefore, no halftone dots are printed, or the printed halftone dots become blurred within an area 8 of a print sheet 6, which is positionally aligned with the lowered halftone dot convexities 4*a*, 4*b*.

Consequently, as shown in FIG. 22B of the accompanying drawings, a resultant print 6*p* includes an area 8*p* where no halftone dots are printed, or where the printed halftone dots become blurred, within a halftone dot area 4*p* near to the solid area 2*p* shown in crosshatching.

The third problem is that, inasmuch as during the printing process, printing pressure is applied unstably to adjacent halftone dot areas having different halftone dot area ratios, different printed areas tend to exhibit different printing densities. As a result, print reproducibility becomes unstable when prints are repeatedly produced.

SUMMARY OF THE INVENTION

An object of the present invention is to provide a printing relief plate producing apparatus, a printing relief plate producing system, a printing relief plate producing method, and a recording medium for producing a printing relief plate, which are capable of achieving a stable printing density for various images including screen tint regions and small-dot image regions.

According to an aspect of the present invention, there is provided a printing relief plate producing apparatus for producing a printing relief plate having a plurality of halftone dot convexities disposed on a surface of a printing plate material, for printing halftone dots on a print medium by transferring ink to the print medium.

The printing relief plate producing apparatus comprises a binary image data generator for generating binary image data based on multivalued image data representative of a printed image, a height data generator for generating height data for determining heights of the halftone dot convexities based on the multivalued image data, and an amount-of-exposure data generator for generating amount-of-exposure data associated with amounts of exposure to the printing plate material, based on the height data generated by the height data generator and the binary image data, in order to produce a printing relief plate in which the halftone dot convexities have heights at a plurality of height levels within a screen tint region, which is formed based on the binary image data generated by the binary image data generator.

As described above, the printing relief plate producing apparatus includes the height data generator for generating height data for determining heights of the halftone dot convexities based on the multivalued image data, and the amount-of-exposure data generator for generating amount-of-exposure data, based on the height data and the binary image data, in order to produce a printing relief plate in which the halftone dot convexities have heights at a plurality of height levels within a screen tint region, which is formed based on the generated binary image data. Consequently, it is possible to produce a printing relief plate in which halftone dot convexities having different height levels are appropriately arranged. The printing relief plate thus generated is capable of transferring ink therefrom to a print medium in order to achieve a target density. Accordingly, various images including screen tint image areas can be printed while maintaining a stable printing density.

The printing relief plate producing apparatus preferably further comprises a convexity height determiner for determining heights of the halftone dot convexities, such that the area ratio difference, within an image area of a constant halftone dot area ratio in the screen tint region, between an average area ratio of the halftone dots printed on the print medium and the constant halftone dot area ratio, is smaller than an area ratio difference for heights of the halftone dot convexities that are identical to each other. Thus, any significant differences between design and actual values of the halftone dot area ratio can be corrected, thus making it possible to reduce tone jumps caused by the gradation converting process.

The amount-of-exposure data generator preferably comprises a convexity height converter for converting pixel values of the binary image data into heights of the halftone dot convexities, based on halftone dot area ratios depending on pixels of the binary image data and the height data, which are associated in advance with the halftone dot area ratios.

The height data preferably comprise a matrix associated in advance with a positional relation to the height levels and not exceeding the size of the binary image data, and the convexity height converter preferably periodically associates pixel values of the binary image data with the height data, by periodically arranging the matrix in an image area of the binary image data. Since the halftone dot convexities at plural height levels are periodically arranged in this manner, a stable printing pressure is applied, thereby reducing density variations at different printed regions.

The matrix is preferably determined such that main halftone dot convexities having a maximum height level of the height levels are not disposed adjacent to each other. Since the main halftone dot convexities, which apply the highest printing pressure to the print medium, are positionally distributed, a more stable printing pressure is applied, thereby reducing density variations at different printed regions.

The height data preferably are determined so as to be constant at a prescribed halftone dot area ratio or greater, and so as to decrease as the halftone dot area ratio decreases below the prescribed halftone dot area ratio.

The matrix preferably has a size equal to an integral multiple of the size of a threshold matrix for converting the multivalued image data into the binary image data.

The printing relief plate producing apparatus preferably further comprises an exposure unit for exposing the printing plate material to a light beam, based on the amount-of-exposure data generated by the amount-of-exposure data generator.

The height levels preferably include at least three levels.

According to another aspect of the present invention, there is provided another printing relief plate producing apparatus for producing a printing relief plate having a plurality of halftone dot convexities disposed on a surface of a printing plate material, for printing halftone dots on a print medium by transferring ink to the print medium.

The printing relief plate producing apparatus comprises an amount-of-exposure data generator for generating amount-of-exposure data associated with an amount of exposure to the printing plate material, based on binary image data representative of a printed image, a changing data generator for generating changing data for changing heights of the halftone dot convexities based on the binary image data, an amount-of-exposure data changer for changing the amount-of-exposure data based on the changing data generated by the changing data generator, in order to produce a printing relief plate in which the halftone dot convexities have heights at a plurality of height levels within a screen tint region, which is formed based on the amount-of-exposure data generated by the amount-of-exposure data generator, and an exposure unit for exposing the printing plate material to a light beam, based on the amount-of-exposure data changed by the amount-of-exposure data changer.

As described above, the printing relief plate producing apparatus includes the changing data generator for generating changing data for changing heights of the halftone dot convexities based on the binary image data, and the amount-of-exposure data changer for changing the amount-of-exposure data based on the changing data generated by the changing data generator, in order to produce a printing relief plate in which the halftone dot convexities have heights at a plurality of height levels within a screen tint region, which is formed based on the amount-of-exposure data generated by the amount-of-exposure data generator. Consequently, it is possible to produce a printing relief plate in which halftone dot convexities having different height levels are appropriately arranged. The printing relief plate thus generated is capable of transferring ink to a print medium to achieve a target density. Accordingly, various images including small-dot image areas can be printed while maintaining a stable printing density.

The changing data generator preferably comprises a feature area extractor for extracting, as a small dot from an image area of said binary image data within said screen tint region, an image area in which the number of adjacent pixels, which are in an ON state, is equal to or less than a predetermined number, and a template allocator for allocating a prescribed template image in an image area of the small dot extracted by the feature area extractor, to thereby generate the changing data.

The changing data generator preferably further includes a template storage unit for storing the template image depending on a shape or attribute of the small dot.

The amount-of-exposure data changer preferably produces a value, as new amount-of-exposure data, by weighting and adding the amount-of-exposure data from the amount-of-exposure data generator and the changing data from the changing data generator, using weighting coefficients depending on the number of pixels within the image area of the small dot.

The height levels preferably include at least three levels.

According to still another aspect of the present invention, there is provided a printing relief plate producing system for producing a printing relief plate having a plurality of halftone dot convexities disposed on a surface of a printing plate material, for printing halftone dots on a print medium by transferring ink to the print medium, comprising a RIP for generating binary image data based on multivalued image data representative of a printed image, and a printing relief plate producing apparatus for producing the printing relief plate by exposing the printing plate material to a light beam, based on the binary image data generated by the RIP. The printing relief plate producing apparatus comprises an amount-of-exposure data generator for generating amount-of-exposure data associated with an amount of exposure to the printing plate material based on the binary image data, a changing data generator for generating changing data for changing heights of the halftone dot convexities based on the binary image data, an amount-of-exposure data changer for changing the amount-of-exposure data based on the changing data generated by the changing data generator, in order to produce a printing relief plate in which the halftone dot convexities have heights at a plurality of height levels within a screen tint region, which is formed based on the amount-of-exposure data generated by the amount-of-exposure data generator, and an exposure unit for exposing the printing plate material to a light beam, based on the amount-of-exposure data changed by the amount-of-exposure data changer.

According to yet another aspect of the present invention, there is provided a method of producing a printing relief plate having a plurality of halftone dot convexities disposed on a surface of a printing plate material, for printing halftone dots on a print medium by transferring ink to the print medium, comprising the steps of generating binary image data based on multivalued image data representative of a printed image, generating height data for determining heights of the halftone dot convexities based on the multivalued image data, generating amount-of-exposure data based on the generated height data and the binary image data, in order to produce a printing relief plate in which the halftone dot convexities have heights at a plurality of height levels within a screen tint region, which is formed based on the generated binary image data, and exposing the printing plate material to a light beam based on the generated amount-of-exposure data.

According to yet still another aspect of the present invention, there is also provided a method of producing a printing relief plate having a plurality of halftone dot convexities disposed on a surface of a printing plate material, for printing halftone dots on a print medium by transferring ink to the print medium, comprising the steps of generating amount-of-exposure data associated with an amount of exposure to the printing plate material, based on binary image data representative of a printed image, generating changing data for changing heights of the halftone dot convexities based on the binary image data, changing the amount-of-exposure data based on the generated changing data, in order to produce a printing relief plate in which the halftone dot convexities have heights at a plurality of height levels within a screen tint region, which is formed based on the generated amount-of-exposure data, and exposing the printing plate material to a light beam based on the changed amount-of-exposure data.

According to a further aspect of the present invention, there is provided a recording medium storing therein a program for enabling a computer to generate amount-of-exposure data associated with an amount of exposure to a printing plate material, in order to produce a printing relief plate having a plurality of halftone dot convexities disposed on a surface of a printing plate material, for printing halftone dots on a print medium by transferring ink to the print medium, wherein the program enables the computer to function as a binary image data generator for generating binary image data based on multivalued image data representative of a printed image, a height data generator for generating height data for determining heights of the halftone dot convexities based on the multivalued image data, and an amount-of-exposure data generator for generating amount-of-exposure data associated with amounts of exposure to the printing plate material, based on the height data generated by the height data generator and the binary image data, in order to produce a printing relief plate in which the halftone dot convexities have heights at a plurality of height levels within a screen tint region, which is formed based on the binary image data generated by the binary image data generator.

According to a still further aspect of the present invention, there is also provided a recording medium storing therein a program for enabling a computer to generate amount-of-exposure data associated with an amount of exposure to a printing plate material, in order to produce a printing relief plate having a plurality of halftone dot convexities disposed on a surface of a printing plate material, for printing halftone dots on a print medium by transferring ink to the print medium, wherein the program enables the computer to function as an amount-of-exposure data generator for generating amount-of-exposure data associated with an amount of exposure to the printing plate material based on binary image data representative of a printed image, a changing data generator for generating changing data for changing heights of the halftone dot convexities based on the binary image data, and an amount-of-exposure data changer for changing the amount-of-exposure data based on the changing data generated by the changing data generator, in order to produce a printing relief plate in which the halftone dot convexities have heights at a plurality of height levels within a screen tint region, which is formed based on the amount-of-exposure data generated by the amount-of-exposure data generator.

With the printing relief plate producing apparatus, the printing relief plate producing method, and the recording medium according to the present invention, binary image data are generated based on multivalued image data representative of a printed image, and height data for determining heights of the halftone dot convexities are generated based on the multivalued image data. Further, amount-of-exposure data are generated based on the generated height data and the binary image data, in order to produce a printing relief plate in which the halftone dot convexities have heights at a plurality of height levels within a screen tint region, which is formed based on the generated binary image data.

With the printing relief plate producing apparatus, the printing relief plate producing system, the printing relief plate producing method, and the recording medium according to the present invention, furthermore, amount-of-exposure data are generated based on binary image data, and changing data for changing heights of the halftone dot convexities are generated based on the binary image data. The amount-of-exposure data are changed based on the generated changing data, in order to produce a printing relief plate in which the halftone dot convexities have heights at a plurality of height levels within a screen tint region, which is formed based on the generated amount-of-exposure data.

As described above, the height data (or the changing data) for determining (or changing) heights of the halftone dot convexities are generated (or changed) based on the multivalued image data (or the binary image data). Further, in order to produce a printing relief plate in which the halftone dot convexities have heights at a plurality of height levels within the formed screen tint region, the amount-of-exposure data are generated (or changed) based on the generated (or changed) height data (or the changing data). Consequently, it is possible to produce a printing relief plate in which halftone dot convexities having different height levels are appropriately arranged. The printing relief plate thus generated is capable of transferring ink therefrom to a print medium in order to achieve a target density. Accordingly, various images including screen tint image areas, can be printed while maintaining a stable printing density.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 5A through 5C are diagrams showing specific numerical values of height conversion matrices;

FIG. 17 is a table showing an example of an image processing sequence carried out by a feature region extractor shown in FIG. 15;

FIG. 18A is a diagram showing an example of amount-of-exposure data assigned to a single small dot;

FIG. 18B is a diagram showing specific numerical values of a template for an isolated small-dot image;

FIG. 18C is a diagram showing an example of amount-of-exposure data that has been changed;

DESCRIPTION OF THE PREFERRED EMBODIMENTS

Printing relief plate producing methods according to preferred embodiments of the present invention, in relation to printing relief plate producing apparatus and printing relief plate producing systems for carrying out the printing relief plate producing methods, will be described in detail below with reference to the accompanying drawings.

First, a printing relief plate producing apparatus according to a first embodiment of the present invention will be described in detail below with reference to FIGS. 1 through 13.

Figure 1:
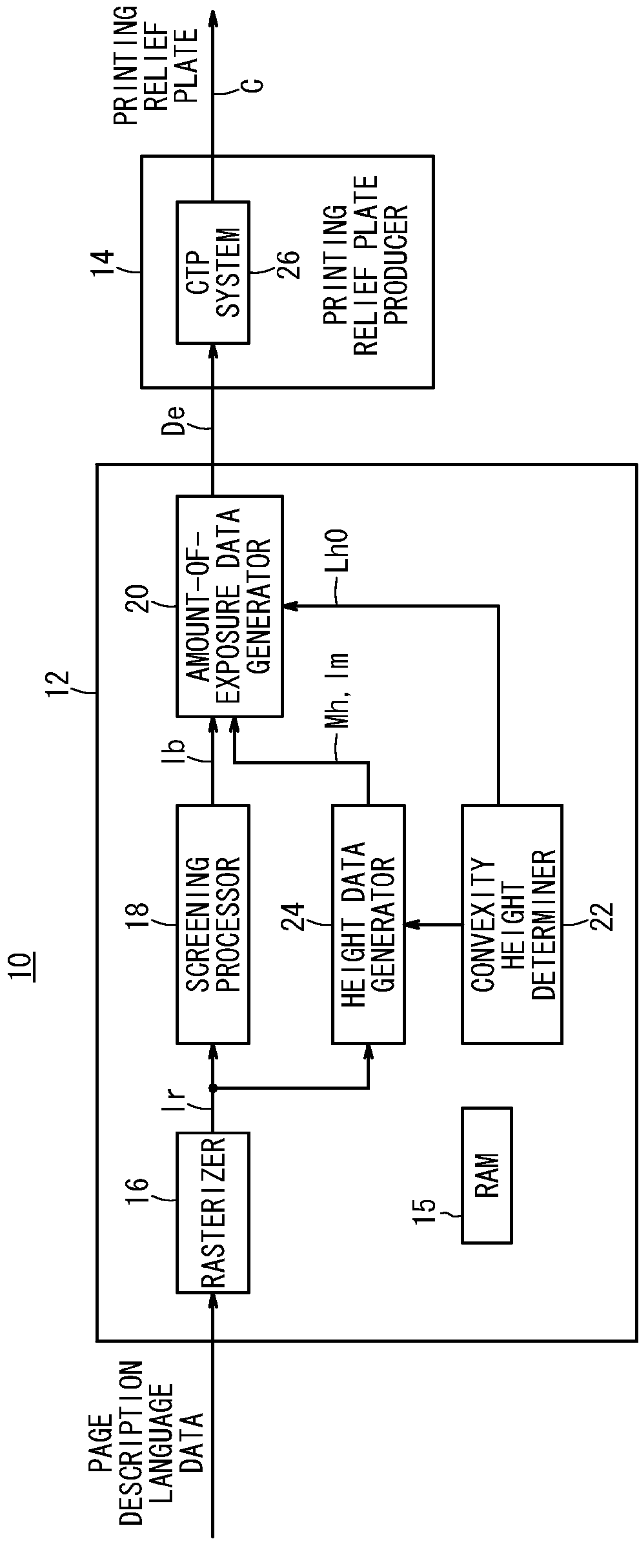
FIG. 1 is a block diagram of a printing relief plate producing apparatus according to a first embodiment of the present invention.

FIG. 1 is a block diagram of a platemaking apparatus (printing relief plate producing apparatus) 10 according to a first embodiment of the present invention. As shown in FIG. 1, the platemaking apparatus 10 basically comprises a RIP (Raster Image Processor) 12 and a printing relief plate producer 14.

The RIP 12 includes a rasterizer 16, a screening processor (binary image data generator) 18, an amount-of-exposure data generator 20, a convexity height determiner 22, and a height data generator 24.

The rasterizer 16 converts PDL (Page Description Language) data, such as PDF (Portable Document Format) data, PS (PostScript: registered trademark) data, or the like, which represent vector images of printed documents edited using a computer or the like, into raster image data Ir.

The raster image data Ir comprise image data Ii (pixel data), which take gradation values that usually are of 8 bits in each of four channels of C, M, Y, K, i.e., 256 (0 through 255) gradation values. In the first embodiment, to facilitate understanding of the invention, it shall be assumed that the 256 gradation values have been converted into corresponding halftone dot area ratios Har in the range from 0% to 100%. More specifically, it is assumed that the image data Ii assume values in a range from 0% to 100%. If the image data Ii are represented by Ii=100, then a solid area 200 (see FIG. 3) is produced. If the image data Ii are represented by Ii=0, then halftone dot convexities (halftone dot convexities for printing halftone dots, or simply convexities) 204 (see FIG. 3) are not produced.

The screening processor 18 performs a screen process on the raster image data Ir, under conditions including a predetermined screen (an AM screen or an FM screen, and screen dot shapes), a screen angle, a screen ruling, etc., thereby converting the raster image data Ir into binary image data Ib.

The amount-of-exposure data generator 20 converts the binary image data Ib into amount-of-exposure data De, which are associated with an amount of exposure for a flexographic printing plate (printing plate) F. The amount-of-exposure data De have 16-bit values (65536 gradations), for example. In the first embodiment, to facilitate understanding of the invention, it shall be assumed that the 65536 gradations (0 through 65535) have been converted into values within a range from 0 to 1 for corresponding amounts of exposure, and at equal intervals (linearly).

The convexity height determiner 22 determines heights of the halftone dot convexities 204 (see FIG. 3) according to a process to be described later, and supplies various items of information concerning the determined heights of the halftone dot convexities 204 to the amount-of-exposure data generator 20, or to the height data generator 24. Such items of information concerning the determined heights of the halftone dot convexities 204 include the maximum height difference, the configuration of an array of halftone dot blocks, the number of levels of convexity heights, the conversion characteristics for halftone dot cells, etc.

The height data generator 24 generates height data based on binary image data Ib supplied from the screening processor 18, and supplies the generated height data to the amount-of-exposure data generator 20.

As described later, the height data define data for determining heights of the halftone dot convexities 204 (FIG. 3) in order to adjust an amount of ink to be transferred. The height data include a height conversion matrix Mh, together with matrix selecting information Im.

Figure 3:
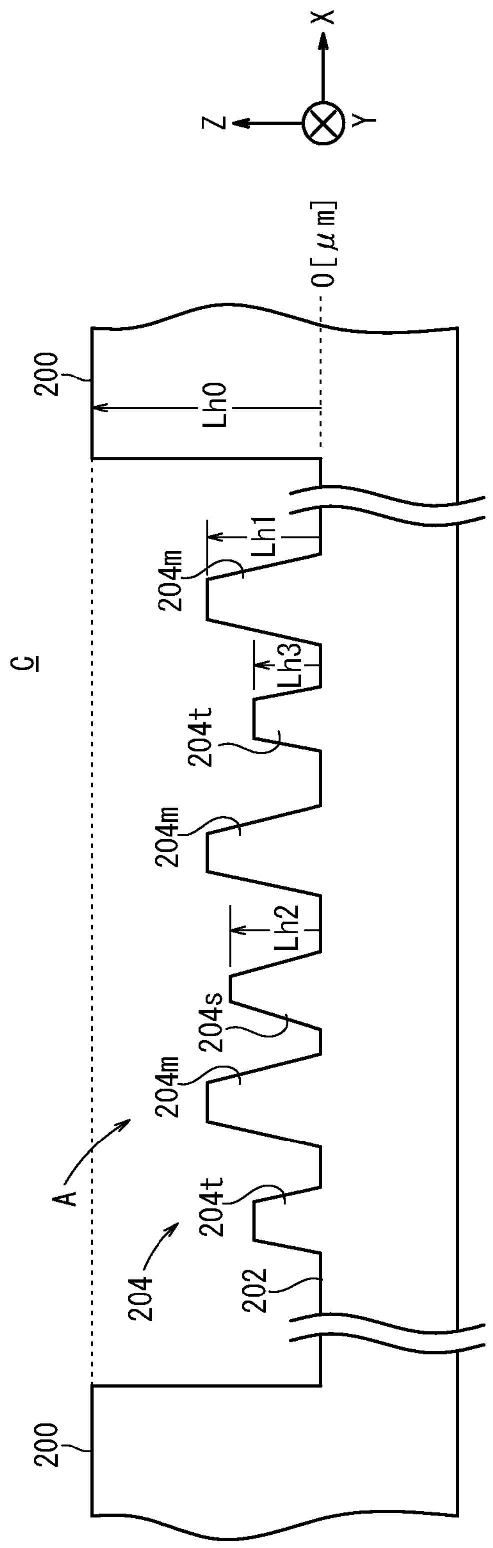
FIG. 3 is an enlarged fragmentary cross-sectional view of the printing relief plate.
Figure 11:
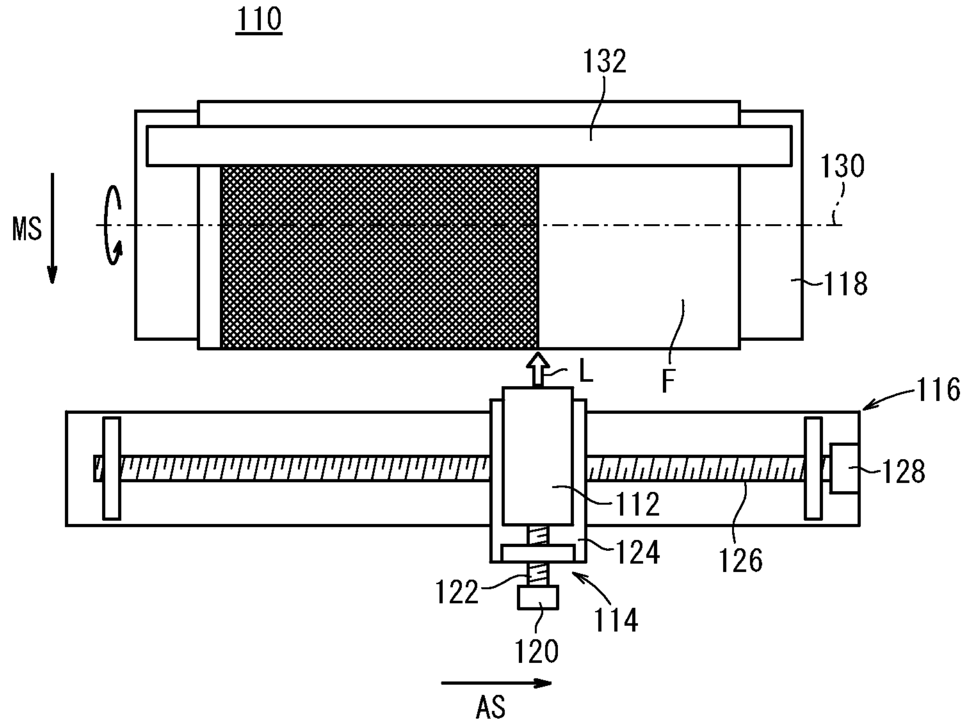
FIG. 11 is a schematic plan view of a laser engraving machine for producing the printing relief plate shown in FIG. 3.

The printing relief plate producer 14 includes an engraving CTP (Computer To Plate) system 26 including a laser engraving machine 110 (exposure unit; see FIG. 11). Based on the amount-of-exposure data De supplied from the amount-of-exposure data generator 20, the engraving CTP system 26 performs a laser engraving process on a flexographic printing plate material F, which is an elastic material such as synthetic resin, rubber, or the like, to thereby produce a printing relief plate C having a plurality of halftone dot convexities 204. As shown in FIG. 3, the halftone dot convexities 204 include main halftone dot convexities 204*m* and halftone dot convexities 204*s*, or main halftone dot convexities 204*m*, halftone dot convexities 204*s*, and halftone dot convexities 204*t*, for example.

Figure 2:
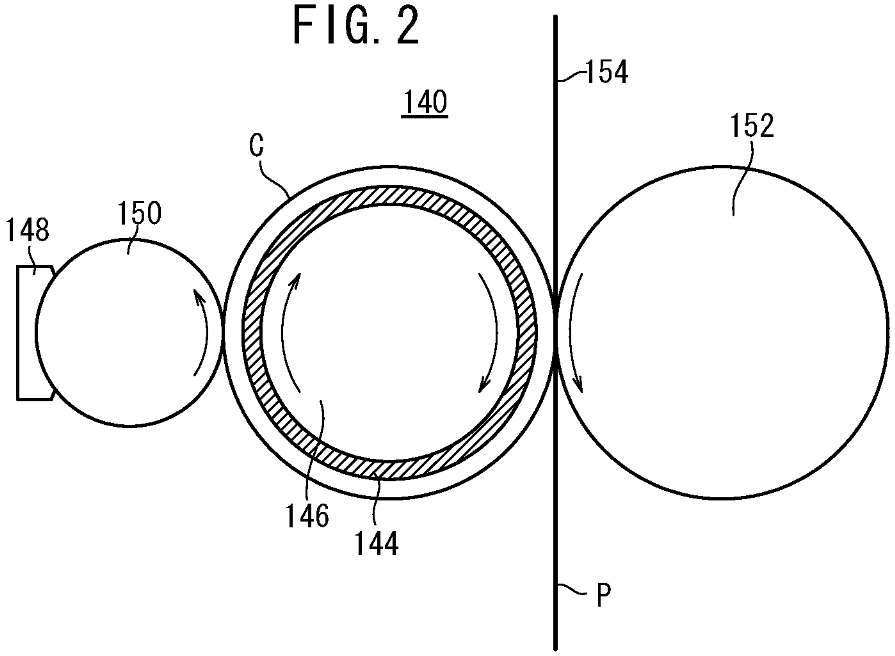
FIG. 2 is a schematic side elevational view showing basic structural details of a flexographic printing press, which incorporates a printing relief plate therein.

FIG. 2 shows basic structural details of a flexographic printing press 140. As shown in FIG. 2, the flexographic printing press 140 comprises a printing relief plate (flexographic printing plate) C produced by the printing relief plate producer 14, a plate cylinder 146 on which the printing relief plate C is mounted via a cushion tape 144 such as a double-sided adhesive tape or the like, an anilox roller 150, which is supplied with ink from a doctor chamber 148, and an impression cylinder 152.

When the flexographic printing press 140 is in operation, ink is transferred from the anilox roller 150 onto apexes (printing surfaces) of the halftone dot convexities 204 on the surface of the printing relief plate C, and then the ink is transferred to a print medium 154 such as a corrugated cardboard material or the like, which is gripped and fed between the plate cylinder 146 on which the printing relief plate C is mounted and the impression cylinder 152, thereby producing a print P on which images made up of halftone dots are formed.

FIG. 3 schematically shows in cross section an example of the printing relief plate C. As shown in FIG. 3, the printing relief plate C, in a condition of being disposed on an outer circumferential surface (X-Y plane) of the plate cylinder 146, includes a solid area 200, which is positioned maximally outward in a radial direction (Z-axis direction), a bottom area 202, which is disposed at the bottom of a recess formed radially inward from the solid area 200 by laser engraving, and halftone dot convexities 204, which are engraved into frustoconical shapes by laser engraving and which project radially outward from the bottom area 202. Among the halftone dot convexities 204, halftone dot convexities having the greatest height (hereinafter referred to as a "first-level convexity height Lh1") in the Z-axis direction, and which reside within a screen tint region A having the same halftone dot area ratio Har, are referred to as main halftone dot convexities 204*m*.

In FIG. 3, for illustrative purposes, the X-axis and the Y-axis represent absolute coordinate axes based on prescribed coordinates, and the Z-axis represents a relative coordinate axis, which has a value of 0 at the position of the bottom area 202.

The maximum height difference Lh0 from the bottom area 202 of the solid area 200, where the halftone dot area ratio Har is Har=100%, has an actual value residing in a range from about 100 to 200 μm, although the actual value depends on the material used for the flexographic printing plate material F.

The halftone dot convexities 204 shown in FIG. 3 comprise printing surfaces (apexes), the heights of which are grouped into a plurality of levels (i.e., convexity heights Lh1, Lh2, Lh3 in first, second, and third levels; Lh1>Lh2>Lh3, as shown in FIG. 3) at the same halftone dot area ratio Har.

Among such halftone dot convexities 204 in the screen tint region A having the same halftone dot area ratio Har, halftone dot convexities of the first-level convexity height Lh1 are referred to as main halftone dot convexities 204*m*, as described above. In FIG. 3, three main halftone dot convexities 204*m* are shown.

In addition, in FIG. 3, one halftone dot convexity 204*s* having a second-level convexity height Lh2 (Lh2<Lh1) is shown, and two halftone dot convexities 204*t* having a third-level convexity height Lh3 (Lh3<Lh2<Lh1) are shown.

As shown in FIG. 1, among the components making up the platemaking apparatus 10, major components according to the present invention include the screening processor 18, the amount-of-exposure data generator 20, and the height data generator 24, which perform a computer-executed sequence, i.e., a data processing sequence performed when a CPU (not shown) executes a program read from a RAM 15 (recording medium). The arrangement and processing details of the screening processor 18, the amount-of-exposure data generator 20, and the height data generator 24 will primarily be described below. For the most part, remaining components of the platemaking apparatus 10 are known from Japanese Laid-Open Patent Publication No. 2008-230195, Japanese Laid-Open Patent Publication No. 2008-183888, Japanese Laid-Open Patent Publication No. 2007-185917, and Japanese Laid-Open Patent Publication No. 2006-095931, and thus such features will not be described in detail below.

Figure 4:
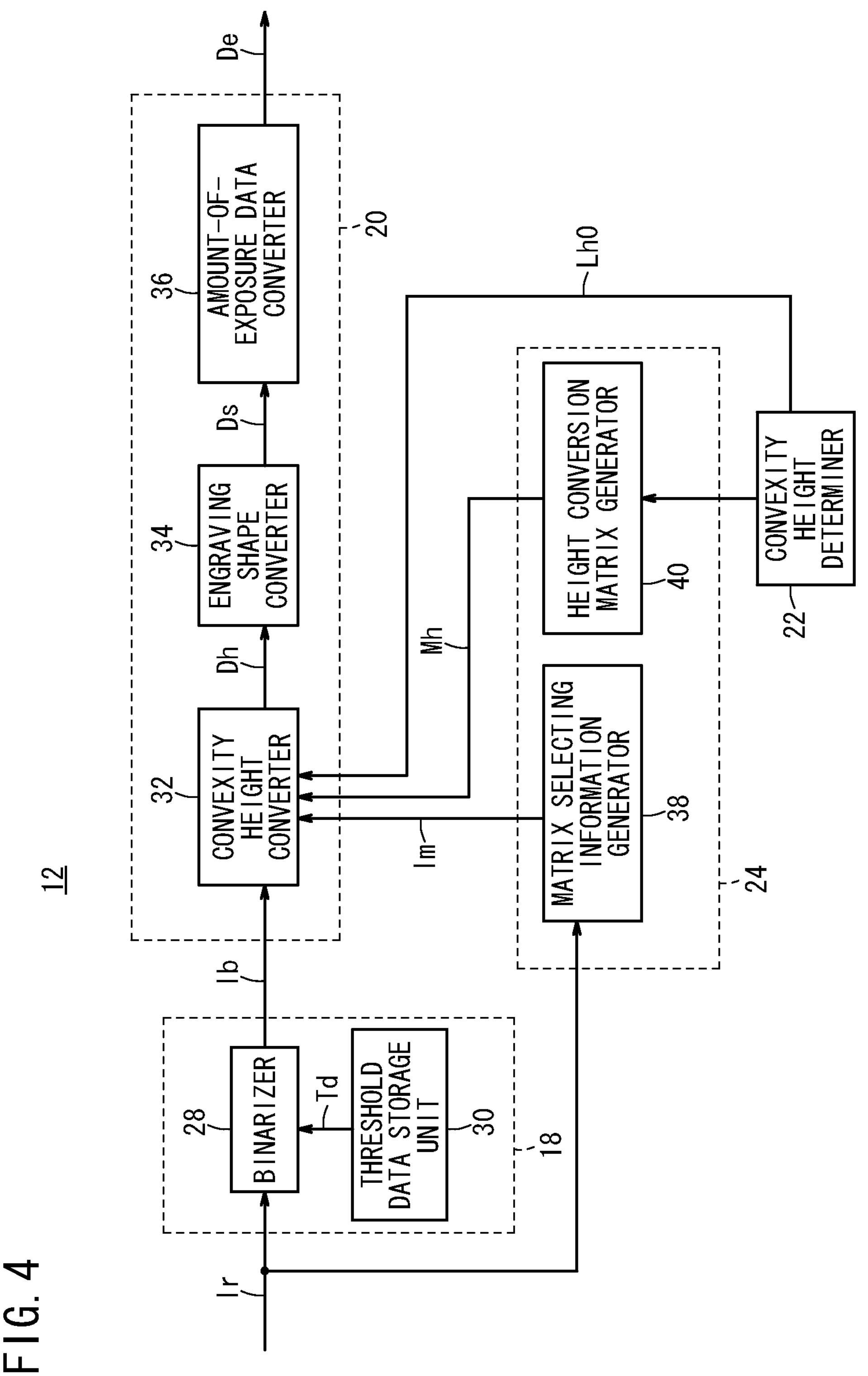
FIG. 4 is a functional block diagram of a screening processor, an amount-of-exposure data generator, and a height data generator shown in FIG. 1.
Figure 6:
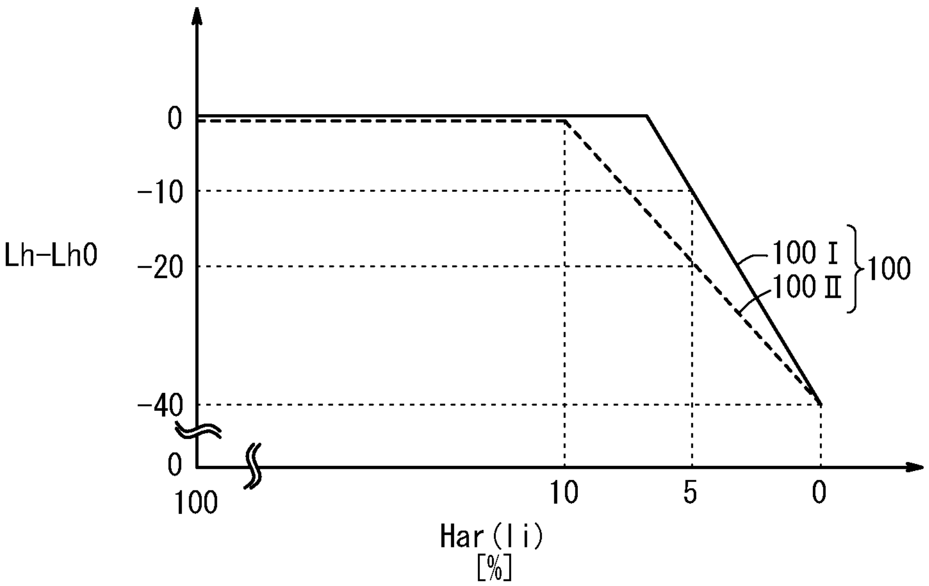
FIG. 6 is a graph showing conversion characteristic curves for converting halftone dot area ratios into convexity heights.
Figure 7A:
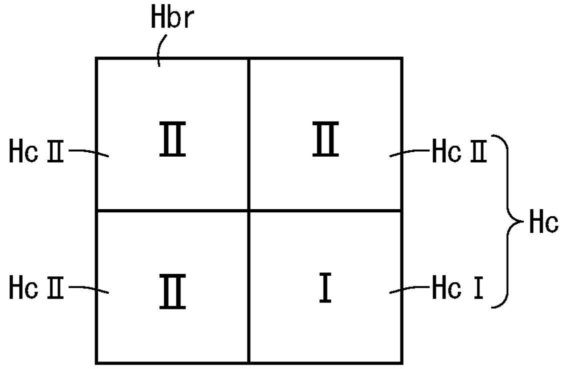
FIG. 7A is a diagram of a halftone dot block.
Figure 7B:
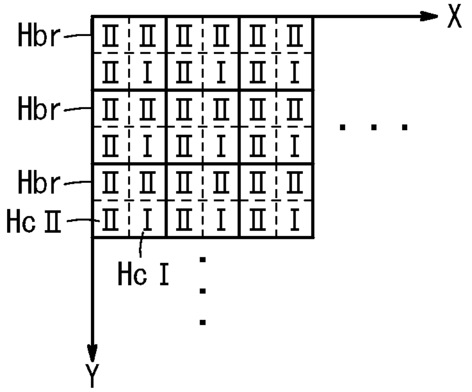
FIG. 7B is a diagram of a repetitive array pattern of halftone dot blocks.
Figure 7C:
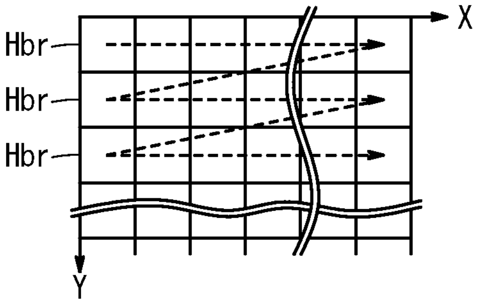
FIG. 7C is a diagram showing a corresponding relationship between image regions of raster image data and halftone dot blocks.
Figure 8:
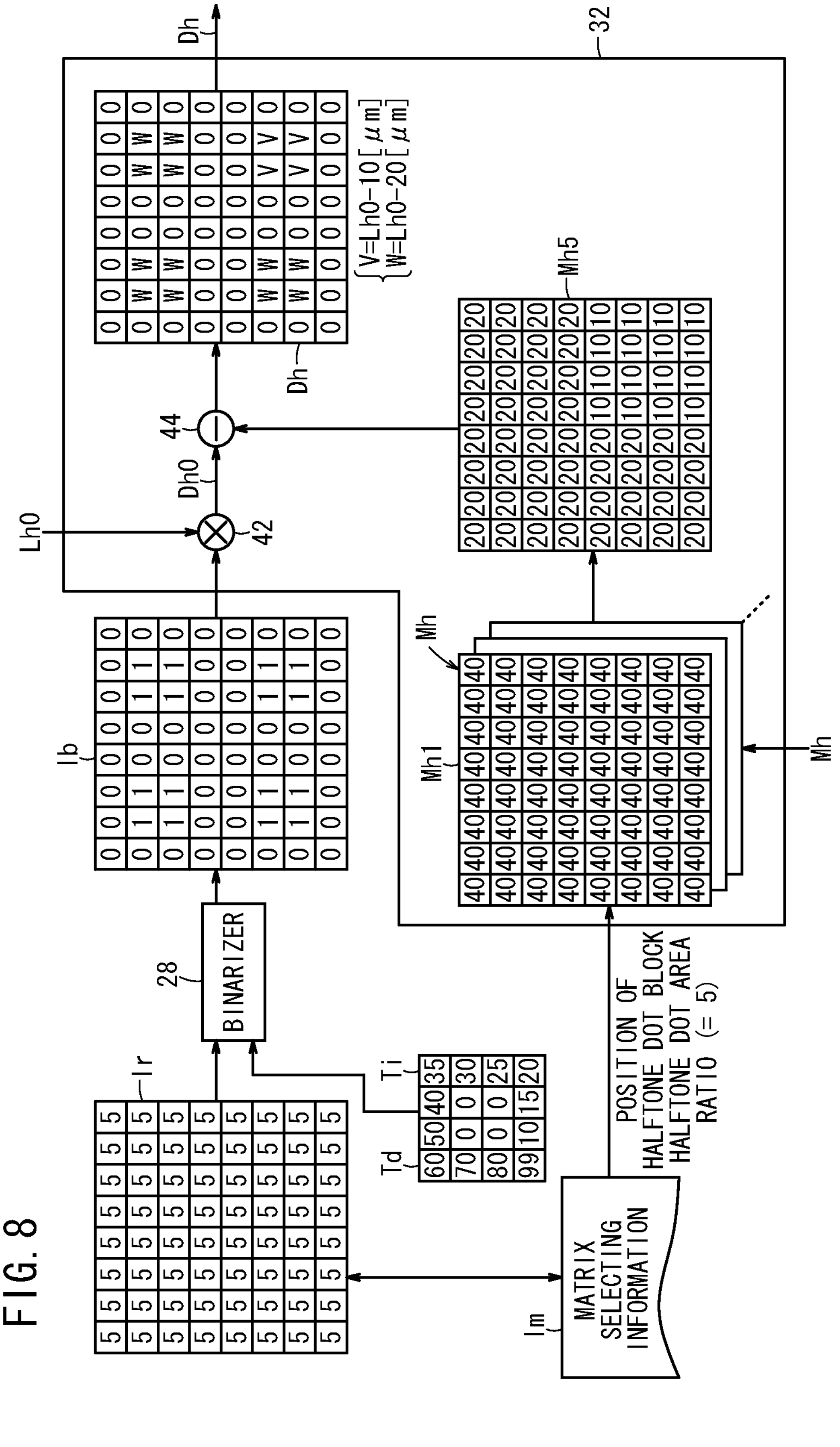
FIG. 8 is a diagram showing the manner in which a convexity height converter shown in FIG. 4 operates.
Figure 9:
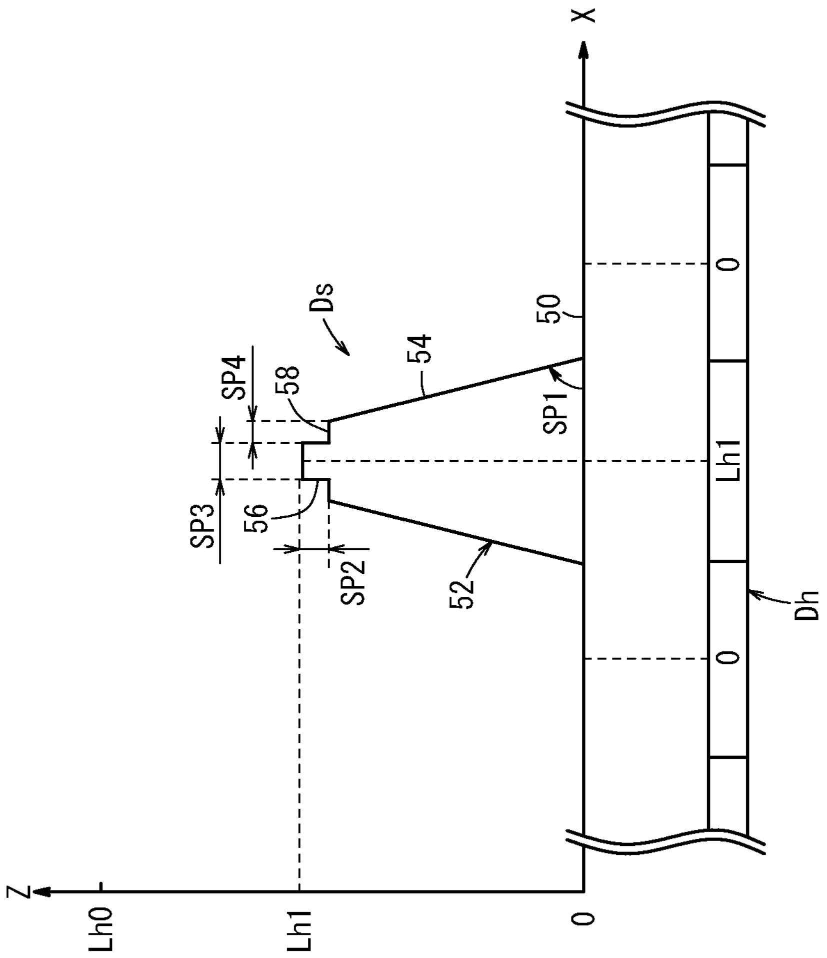
FIG. 9 is a diagram illustrative of a process of converting convexity height data into three-dimensional engraving shape data.
Figure 10A:
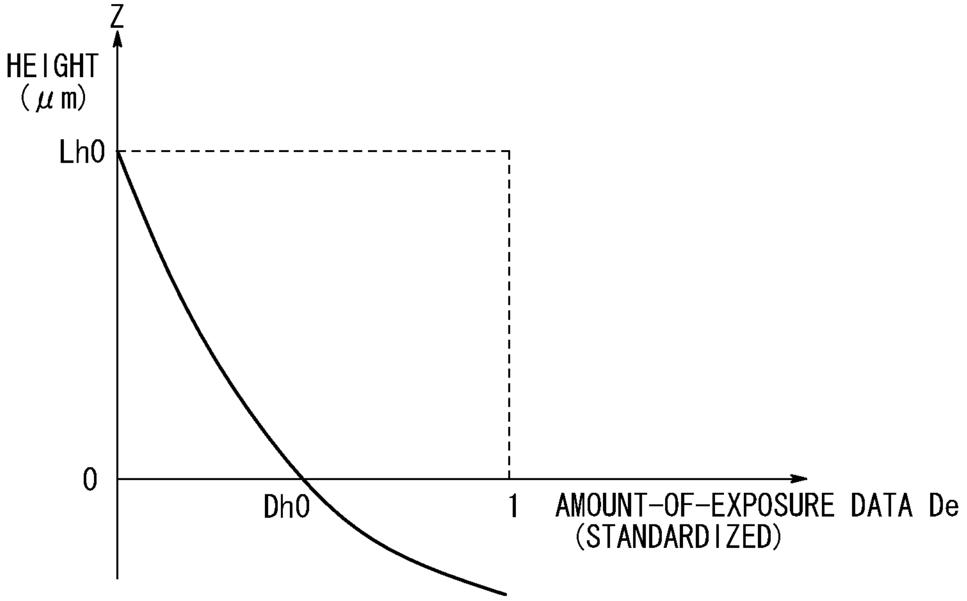
FIG. 10A is a graph showing a relationship between amount-of-exposure data and convexity heights.
Figure 10B:
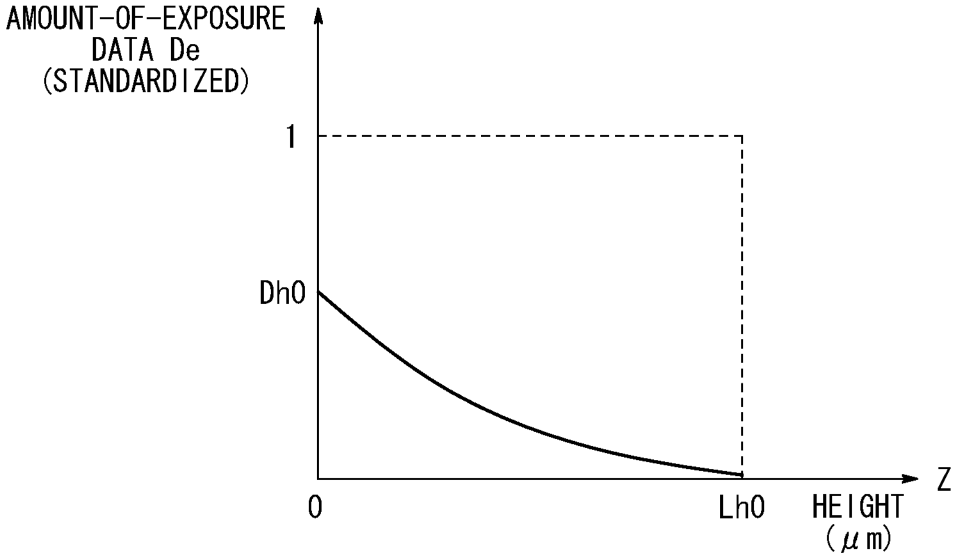
FIG. 10B is a graph showing amount-of-exposure data required to obtain a desired convexity height.

FIG. 4 is a functional block diagram of the screening processor 18, the amount-of-exposure data generator 20, and the height data generator 24 shown in FIG. 1. FIGS. 5A through 5C are diagrams showing specific numerical values of height conversion matrices. FIG. 6 is a graph showing characteristic curves for converting halftone dot area ratios Har into convexity heights. FIG. 7A is a diagram of a halftone dot block Hbr. FIG. 7B is a diagram of a repetitive array pattern of halftone dot blocks Hbr. FIG. 7C is a diagram showing a corresponding relationship between image regions of raster image data Ir and halftone dot blocks Hbr. FIG. 8 is a diagram showing the manner in which the convexity height converter 32 shown in FIG. 4 operates. FIG. 9 is a diagram illustrative of a process of converting convexity height data Dh into engraving shape data Ds. FIG. 10A is a graph showing a relationship between amount-of-exposure data De and convexity heights. FIG. 10B is a graph showing amount-of-exposure data De required to obtain a desired convexity height.

As shown in FIG. 4, the screening processor 18 comprises a binarizer 28 for converting raster image data Ir into binary image data Ib, and a threshold data storage unit 30 for storing data of a threshold matrix Td.

The amount-of-exposure data generator 20 comprises a convexity height converter 32 for converting binary image data Ib supplied from the screening processor 18 into convexity height data Dh, an engraving shape converter 34 for converting the convexity height data Dh into engraving shape data Ds, and an amount-of-exposure data converter 36 for converting the engraving shape data Ds into amount-of-exposure data De.

Convexity height data Dh refer to data representative of a two-dimensional distribution of heights of the halftone dot convexities 204 in X-Y coordinates (see FIG. 3). Engraving shape data Ds refer to data produced when the convexity height data Dh are two-dimensionally interpolated in order to reconstruct a three-dimensional shape of the halftone dot convexities 204.

The height data generator 24 comprises a matrix selecting information generator 38 for generating matrix selecting information Im based on raster image data Ir, and a height conversion matrix generator 40 for generating a height conversion matrix Mh for appropriately adjusting heights of the halftone dot convexities 204 (see FIG. 3).

Data definitions for the height conversion matrix Mh, and a process of generating the height conversion matrix Mh according to features of the present invention will be described below with reference to FIGS. 5A through 7A.

As shown in FIGS. 5A through 5C, each height conversion matrix Mh is defined by a square matrix of pixels, which are arranged in eight horizontal rows and eight vertical columns. The value of each pixel represents a quantity (unit: μm) for determining the height of one halftone dot convexity 204. The height conversion matrices Mh include one hundred height conversion matrices Mh1 through Mh100 depending on halftone dot area ratios of 1% through 100%. For example, FIGS. 5A, 5B, and 5C show specific numerical values of height conversion matrices Mh1, Mh5, and Mh100 at respective halftone dot area ratios of 1%, 5%, and 100%.

A process of generating a height conversion matrix Mh will be described below with reference to FIGS. 6 through 7B.

As shown in FIG. 6, there are provided two height levels for the halftone dot convexities 204, i.e., a first-level convexity height Lh1 and a second-level convexity height Lh2.

The first-level convexity height Lh1 is related to the halftone dot area ratio Har according to a first conversion characteristic curve 100I. To facilitate understanding of the present invention, the vertical axis of the graph shown in FIG. 6 represents relative values of the convexity height (with a variable Lh) in relation to the maximum height difference Lh0. More specifically, according to the first conversion characteristic curve 100I, the first-level convexity height Lh1 remains at 0 μm while the halftone dot area ratio Har is within a range from 100% to 7%, and decreases from 0 μm to −40 μm in proportion to the halftone dot area ratio Har as the halftone dot area ratio Har changes from 7% to 0%.

The second-level convexity height Lh2 is related to the halftone dot area ratio Har according to a second conversion characteristic curve 100II. More specifically, according to the second conversion characteristic curve 100II, the second-level convexity height Lh2 remains at 0 μm while the halftone dot area ratio Har is in a range from 100% to 10%, and decreases from 0 μm to −40 μm in proportion to the halftone dot area ratio Har as the halftone dot area ratio Har changes from 10% to 0%.

In this manner, by reducing the height of the halftone dot convexities 204 (by means of the variable Lh) as the halftone dot area ratio Har decreases from a certain value, the amount of ink transferred to the printing relief plate C can appropriately be controlled. The above converting process is particularly effective for a printing process that uses an elastic flexographic printing plate material F.

As shown in FIG. 7A, the halftone dot block Hbr comprises a combination of a first halftone dot cell HcI having the first conversion characteristic curve 100I, and second halftone dot cells HcII having the second conversion characteristic curve 100II. A halftone dot cell Hc, which represents each of the first halftone dot cell HcI and the second halftone dot cells HcII, serves as a unit image region, in which one halftone dot (halftone dot convexity 204) according to the AM screen process is formed, for example.

The halftone dot cell Hc coincides with a matrix size of threshold data Td, to be described later. For example, as shown in FIG. 8, the threshold data Td are made up of 4×4 pixels.

Each of the height conversion matrices Mh shown in FIGS. 5A through 5C is made up of 8×8 pixels. Numerical values of the height conversion matrices Mh are determined depending on the respective halftone dot area ratios Har. Matrix data of the height conversion matrices Mh represent quantities (engraving lowering quantities) by which the heights of the halftone dot convexities 204 are to be reduced.

An arithmetic process, which is carried out by the convexity height converter 32, for converting binary image data Ib supplied from the screening processor 18 into convexity height data Dh, will be described in detail below with reference to FIGS. 4 and 8.

As shown in FIGS. 4 and 8, the threshold data storage unit 30 of the screening processor 18 stores threshold data (threshold matrix) Td in the form of a matrix of thresholds Ti ranging from 0 to 99.

The binarizer 28 of the screening processor 18 compares image data (pixel data) Ii (0≤Ti≤100) of the raster image data Ir with thresholds Ti (0≤Ti≤99) of the threshold data Td read from the threshold data storage unit 30, and generates binary image data Ibi of binary image data Ib, each of which has a value of 0 or a value of 1, according to the following formula:

$$Ti \le Ti \rightarrow 0,\ Ii > Ti \rightarrow 1 \qquad (1)$$

In the first embodiment, as described above, the image data Ii are represented by halftone dot area ratios Har in a range from 0% to 100%. Among the halftone dot area ratios Har in the range from 0% to 100%, halftone dot area ratios Har in a range from about 0% to 10% correspond to a highlight gradation area of the image, halftone dot area ratios Har in a range from about 10% to 99% correspond to an intermediate gradation area of the image, and the halftone dot area ratio Har of 100% corresponds to a solid area of the image. Generally, halftone dot convexities 204, which are created for the highlight gradation area of the image, may be referred to as small dots or small screen dots.

As shown in FIG. 8, the convexity height converter 32 performs the following arithmetic operation on the binary image data Ib. A multiplier 42 multiplies each of the binary image data Ib by the maximum height difference Lh0, which is supplied from the convexity height determiner 22. In this manner, the convexity height converter 32 acquires convexity height data Dh0 for creating halftone dot convexities 204 of the same height (maximum height difference Lh0).

As shown in FIG. 4, the convexity height determiner 22 determines various items of information concerning heights of the halftone dot convexities 204, which include the maximum height difference Lh0, the configuration of an array of halftone dot blocks Hc, the number of levels of convexity heights, the conversion characteristic curves 100 for the halftone dot cells Hc, etc., based on printing conditions including the flexographic printing plate material F of the printing relief plate C, the type of ink used, etc. Then, based on the various items of information determined by the convexity height determiner 22, the height conversion matrix generator 40 generates a height conversion matrix Mh for each halftone dot area ratio Har.

Data that serve to associate the various items of information concerning heights of the halftone dot convexities 204 with the printing conditions preferably are stored in a storage unit (not shown). For example, such data may be acquired by producing a printing relief plate C having a plurality of screen tint regions A, which represent a variety of combinations of heights and levels of halftone dot convexities 204, then applying ink from the printing relief plate C to the print medium 154 to produce a print P, and colorimetrically measuring the printed color of the print P.

The matrix selecting information generator 38 generates matrix selecting information Im based on raster image data Ir. More specifically, the matrix selecting information generator 38 downsizes the raster image data Ir, so that a unit halftone dot block Hbr serves as one pixel. At this time, a new pixel value, which serves as the matrix selecting information Im, is represented by an average of the pixel values (halftone dot area ratios Har) within the halftone dot block Hbr. In other words, a new pixel value, which serves as the matrix selecting information Im, is represented by a typical pixel value within the halftone dot block Hbr. The new pixel value may be obtained as any of various statistical values, including median and mode.

As shown in FIG. 8, the convexity height converter 32 specifies an image area (an area having the size of the halftone dot block Hbr) to be calculated from among the convexity height data Dh0, and selects an appropriate height conversion matrix Mh (Mh5 in FIG. 8) depending on the specified image area. A subtractor 44 subtracts values of the selected height conversion matrix Mh from values of the image area among the convexity height data Dh0. The subtractor 44 subtracts values of the selected height conversion matrix Mh from values of all of the image areas in order to produce convexity height data Dh.

As shown in FIG. 7B, halftone dot blocks Hbr may be repeated horizontally and vertically over image areas of the raster image data Ir in order to make the heights of the halftone dot convexities 204 periodic in layout. Since the halftone dot convexities 204, which have a plurality of height levels, are periodic in layout, the printing pressure is applied stably to the print medium 154 (see FIG. 2), for thereby reducing density fluctuations at different printed spots.

As shown in FIG. 7B, main halftone dot convexities 204*m*, which will apply the greatest printing pressure to the print medium 154, may be positioned so as not to be adjacent to each other. Since the main halftone dot convexities 204*m* are distributed while being dispersed around in layout, the printing pressure is applied more stably to the print medium 154.

Furthermore, as shown in FIG. 7C, a sequence for specifying image areas may be predetermined along directions indicated by the broken-line arrows, so that an appropriate height conversion matrix Mh can be selected by successively reading values of the halftone dot area ratios Har of the matrix selecting information Im.

In addition, if the size of the height conversion matrix Mh is an integral multiple of the size of the threshold matrix, then halftone dot convexities 204 having different heights are rendered periodic in layout in any of the image areas, thereby reducing local Moire patterns.

As shown in FIG. 4, the engraving shape converter 34 converts the convexity height data Dh supplied from the convexity height converter 32 into engraving shape data Ds of a higher resolution.

As shown in FIG. 9, a hypothetical halftone dot convexity 52 is illustrated as being positioned on a hypothetical bottom area 50 extending along the positive Z-axis direction. The hypothetical halftone dot convexity 52 includes a frustoconical base 54, a cylindrical convex apex 56 disposed on the frustoconical base 54, and an annular shoulder 58 extending around the cylindrical convex apex 56. The frustoconical base 54 has a tilt angle SP1, the cylindrical convex apex 56 has a height SP2 and a diameter SP3, and the annular shoulder 58 has a ring width SP4. The tilt angle SP1, the height SP2, the diameter SP3, and the ring width SP4 serve as parameters for determining the shape of the hypothetical halftone dot convexity 52 shown in FIG. 9. Based on the above parameters, a three-dimensional shape (engraving shape) is determined for creating the halftone dot convexities 204.

More specifically, the engraving shape converter 34 determines the distance from each pixel having a pixel value of 1 (ON) to a closest pixel having a pixel value of 0 (OFF), and thereafter determines an engraving shape depending on the predetermined parameters SP1, SP2, SP3, and SP4 referred to above. The engraving shape converter 34 may determine the distance according to any of known distance converting algorithms, including a Euclidean distance converting algorithm.

As shown in FIG. 4, the amount-of-exposure data converter 36 converts the engraving shape data Ds supplied from the engraving shape converter 34 into amount-of-exposure data De, which are associated with amounts of exposure to be applied to the flexographic printing plate material F of the printing relief plate C.

For example, it is assumed that a relationship exists between the amount-of-exposure data De and the convexity heights (differences between the maximum height difference Lh0 and engraved depths), which is represented by the graph shown in FIG. 10A. Further, De0 represents a value of the amount-of-exposure data De, which is used for obtaining an engraving quantity for the maximum height difference Lh0. As shown in FIG. 10B, it is then possible to estimate amount-of-exposure data De, which is required to obtain a convexity height (each value of the engraving shape data Ds).

In this manner, the amount-of-exposure data generator 20 generates amount-of-exposure data De from the binary image data Ib.

As shown in FIG. 1, when the amount-of-exposure data De determined by the RIP 12 are sent to and received by the printing relief plate producer 14, the engraving CTP system 26 performs a laser engraving process on a flexographic printing plate material F based on the amount-of-exposure data De, thereby producing a printing relief plate C having a plurality of halftone dot convexities 204 as well as a solid area 200.

FIG. 11 is a schematic plan view of a laser engraving machine 110, which serves as an engraving CTP system 26 for producing a printing relief plate C.

As shown in FIG. 11, the laser engraving machine 110 includes an exposure head 112, a focused position changing mechanism 114, and an intermittent feeding mechanism 116.

The focused position changing mechanism 114 includes a motor 120 and a ball screw 122 for moving the exposure head 112 toward and away from a drum 118 on which a flexographic printing plate material F is mounted. When the motor 120 is energized, the motor 120 rotates the ball screw 122 about its axis in order to move the exposure head 112 toward and away from a drum 118, for thereby moving the focused position of a laser beam L that is emitted from the exposure head 112.

The intermittent feeding mechanism 116 moves a stage 124 with the exposure head 112 mounted thereon in an auxiliary scanning direction AS parallel to the axis 130 of the drum 118. The intermittent feeding mechanism 116 includes a ball screw 126 threaded through the exposure head 112, and an auxiliary scanning motor 128 for rotating the ball screw 126 about its axis. When the auxiliary scanning motor 128 is energized, the auxiliary scanning motor 128 rotates the ball screw 126 about its axis so as to intermittently move the exposure head 112 along the axis 130 of the drum 118.

A flexographic printing plate material F is secured to the drum 118 by a chuck 132, which is located in a position not exposed to the laser beam L emitted from the exposure head 112. While the drum 118 rotates about its axis 130 in order to rotate the flexographic printing plate material F along a main scanning direction MS, the exposure head 112 applies the laser beam L to the flexographic printing plate material F on the drum 118, for thereby performing a laser engraving process along a scanning line on the flexographic printing plate material F, so as to form halftone dot convexities 204 on the surface of the flexographic printing plate material F. Upon continued rotation of the drum 118, when the chuck 132 passes in front of the exposure head 112, the exposure head 112 is intermittently fed along the auxiliary scanning direction AS, whereupon the exposure head 112 performs a laser engraving process along a next scanning line on the flexographic printing plate material F.

While the flexographic printing plate material F is moved along the main scanning direction MS upon rotation of the drum 118, and while the exposure head 112 is fed intermittently along the auxiliary scanning direction AS, the focused position of the laser beam L on the flexographic printing plate material F is controlled. Also, based on the amount-of-exposure data De at each position along the scanning lines, the intensity of the laser beam L is controlled and the laser beam L is turned on and off, so as to create halftone dot convexities 204 forming a relief of a desired shape on the surface of the flexographic printing plate material F.

In this manner, the flexographic printing plate material F, including halftone dot convexities 204 created thereon, is produced as a printing relief plate C, in which heights of the halftone dot convexities 204, which make up a printing surface on which ink is carried, are set at a plurality of levels within a region A having the same halftone dot area ratio Har.

The printing relief plate C then is installed on the flexographic printing press 140.

As shown in FIG. 2, the anilox roller 150 transfers ink to apexes of the halftone dot convexities 204 on the surface of the printing relief plate C. The ink is squeezed between the plate cylinder 146, on which the printing relief plate C is mounted, and the impression cylinder 152, whereupon the ink is transferred to the print medium 154, such as a corrugated cardboard material or the like, which is fed between the impression cylinder 152 and the plate cylinder 146, thereby producing a print P on which an image made up of halftone dots is formed.

Results of the flexographic printing process, which is carried out to produce the print P, will be described below with reference to FIGS. 12A through 12D and FIGS. 13A through 13D. First, the results of a flexographic printing process, in which the amount-of-exposure data generator 20 does not adjust the amount of exposure (see FIG. 1, etc.), will be described below.

Figure 12A:
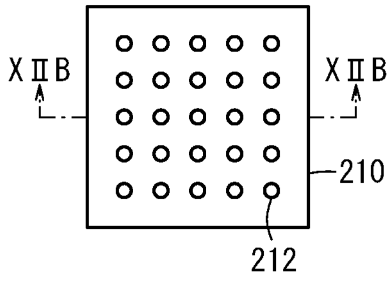
FIGS. 12A through 12D are views showing results of a flexographic printing process, which is carried out using a printing relief plate in which heights of halftone dot convexities have not been corrected.
Figure 12B:
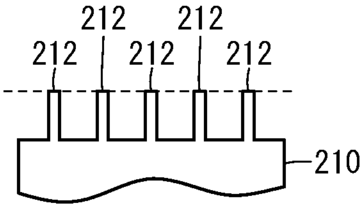
Figure 12C:
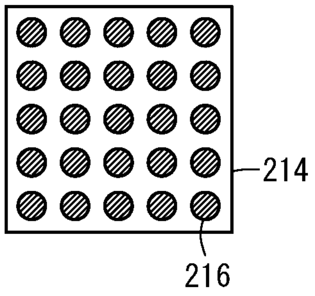

FIG. 12A shows a relief plate 210 with a plurality of halftone dot convexities 212. In FIG. 12B, which is a cross-sectional view taken along line XIIB-XIIB of FIG. 12A, five halftone dot convexities 212 are shown as having the same height. FIG. 12C shows the results of a flexographic printing process performed by transferring ink from the relief plate 210 to a print medium 214.

From FIGS. 12A through 12C, it can be seen that the area of the halftone dots 216 is greater than the area of the printing surfaces of the halftone dot convexities 212, as viewed in plan. Therefore, the printing density of the print medium 214 is higher than the target density. Particularly, if the halftone dots 216 are small, then the difference between the designed density and the measured density is large, especially within the highlighted area.

Figure 12D:
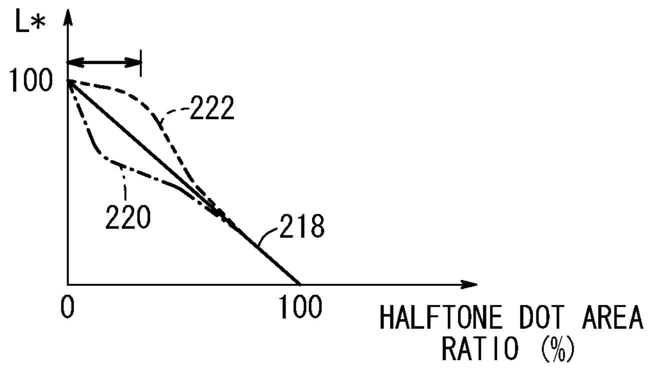

As shown in FIG. 12D, in a highlighted area, an actual gradation characteristic curve 220 is lower than an ideal gradation characteristic curve 218. To correct the actual gradation characteristic curve 220, it is necessary to apply a gradation characteristic curve 222, which is inverse to the actual gradation characteristic curve 220. However, when the gradation characteristic curve 222 is used, a tone jump (a gradation smoothness failure or a gradation level reversal) is caused due to the gradation converting process.

Results of a flexographic printing process, in which the amount-of-exposure data generator 20 adjusts the amount of exposure, will be described below.

Figure 13A:
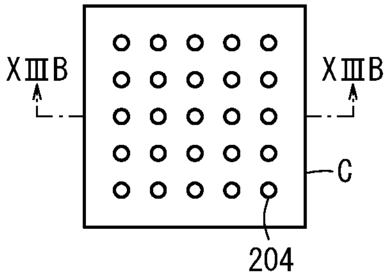
FIGS. 13A through 13D are views showing results of a flexographic printing process, which is carried out using a printing relief plate in which heights of halftone dot convexities have been corrected.
Figure 13B:
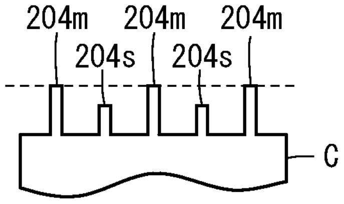
Figure 13C:
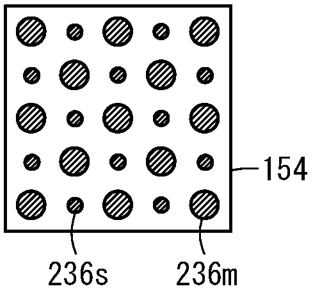

FIG. 13A shows a printing relief plate C having a plurality of halftone dot convexities 204, similar to the relief plate 210 shown in FIG. 12A. As shown in FIG. 13B, which is a cross-sectional view taken along line XIIIB-XIIIB of FIG. 13A, the halftone dot convexities 204 include three main halftone dot convexities 204*m* and two halftone dot convexities 204*s*, which are alternately arranged. FIG. 13C shows the results of a flexographic printing process, which is performed by transferring ink from the printing relief plate C to a print medium 154.

It can be seen from FIG. 13C that the sum of the areas of one main halftone dot 236*m* and one halftone dot 236*s* is smaller than the sum of the areas of two of the halftone dots 216 shown in FIG. 12C. In other words, the actual value of the halftone dot area ratio of the print medium 154 is closer to the design value of the halftone dot area ratio Har. As a result, the print medium 154 has a printing density that is closer to the target density.

Figure 13D:
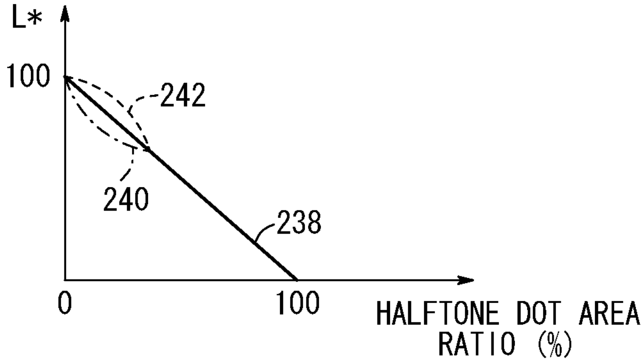

As shown in FIG. 13D, in a highlighted area, an actual gradation characteristic curve 240 is close to an ideal gradation characteristic curve 238. Therefore, a gradation characteristic curve 242, which is used to correct the actual gradation characteristic curve 240, has a smaller adverse effect, thus making it possible to reduce a tone jump caused by the gradation converting process.

According to the first embodiment, as described above, binary image data Ib are generated based on raster image data Ir representative of a printed image, and a height conversion matrix Mh, which is used for determining the height of each halftone dot convexity 204, is generated based on the raster image data Ir. In order to produce a printing relief plate C having halftone dot convexities 204 of different height levels within a screen tint region A, which is formed based on the generated binary image data Ib, amount-of-exposure data De are generated based on the generated height conversion matrix Mh and the binary image data Ib. Then, based on the generated amount-of-exposure data De, a flexographic printing plate material F is exposed to a laser beam L. Consequently, it is possible to produce a printing relief plate C in which halftone dot convexities 204 having different height levels are appropriately arranged. The printing relief plate C thus generated is capable of transferring ink to a print medium to achieve a target density. Accordingly, various images including screen tint image areas can be printed while maintaining a stable printing density.

A printing relief plate producing system according to a second embodiment of the present invention will be described in detail below with reference to FIGS. 14 through 20. Parts according to the second embodiment, which are identical to those according to the first embodiment, are denoted by identical reference characters, and such features will not be described in detail below.

Figure 14:
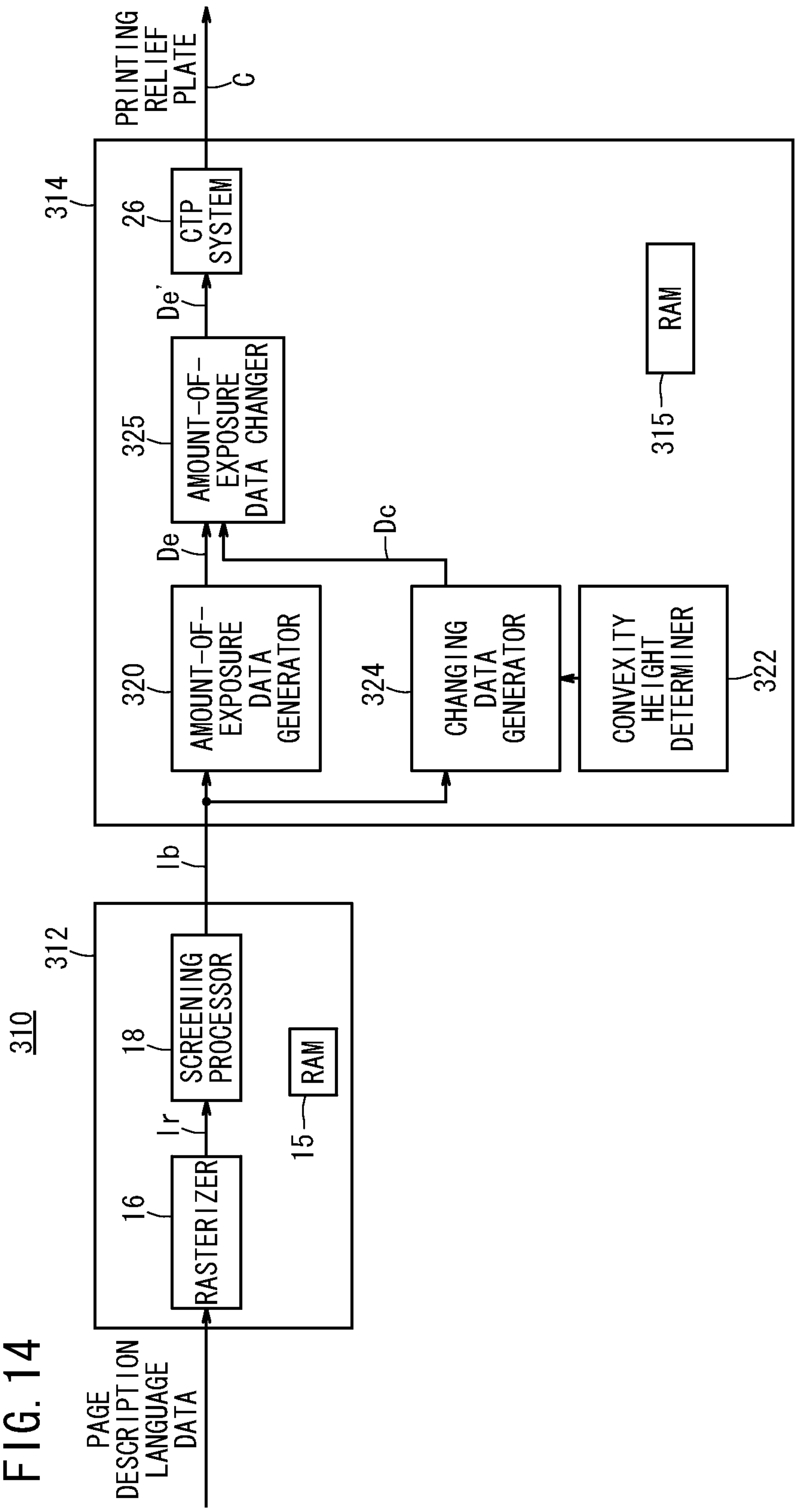
FIG. 14 is a block diagram of a printing relief plate producing apparatus according to a second embodiment of the present invention.

FIG. 14 is a block diagram of a platemaking system 310 (printing relief plate producing system) 310 according to a second embodiment of the present invention. As shown in FIG. 14, the platemaking system 310 basically comprises a RIP (Raster Image Processor) 312 and a printing relief plate producer 314.

The RIP 312 includes a rasterizer 16 and a screening processor 18. The printing relief plate producer 314 includes an amount-of-exposure data generator 320, a convexity height determiner 322, a changing data generator 324, an amount-of-exposure data changer 325, and a CTP system 26. Among the components of the printing relief plate producer 314, the amount-of-exposure data generator 320, the convexity height determiner 322, the changing data generator 324, or the amount-of-exposure data changer 325 may be implemented by a CPU (not shown), which executes a program read from a RAM 315 (recording medium).

The RIP 312 according to the second embodiment differs from the RIP 12 (see FIG. 1) according to the first embodiment, in that the RIP 312 outputs binary image data Ib, whereas the RIP 12 outputs amount-of-exposure data De.

Figure 15:
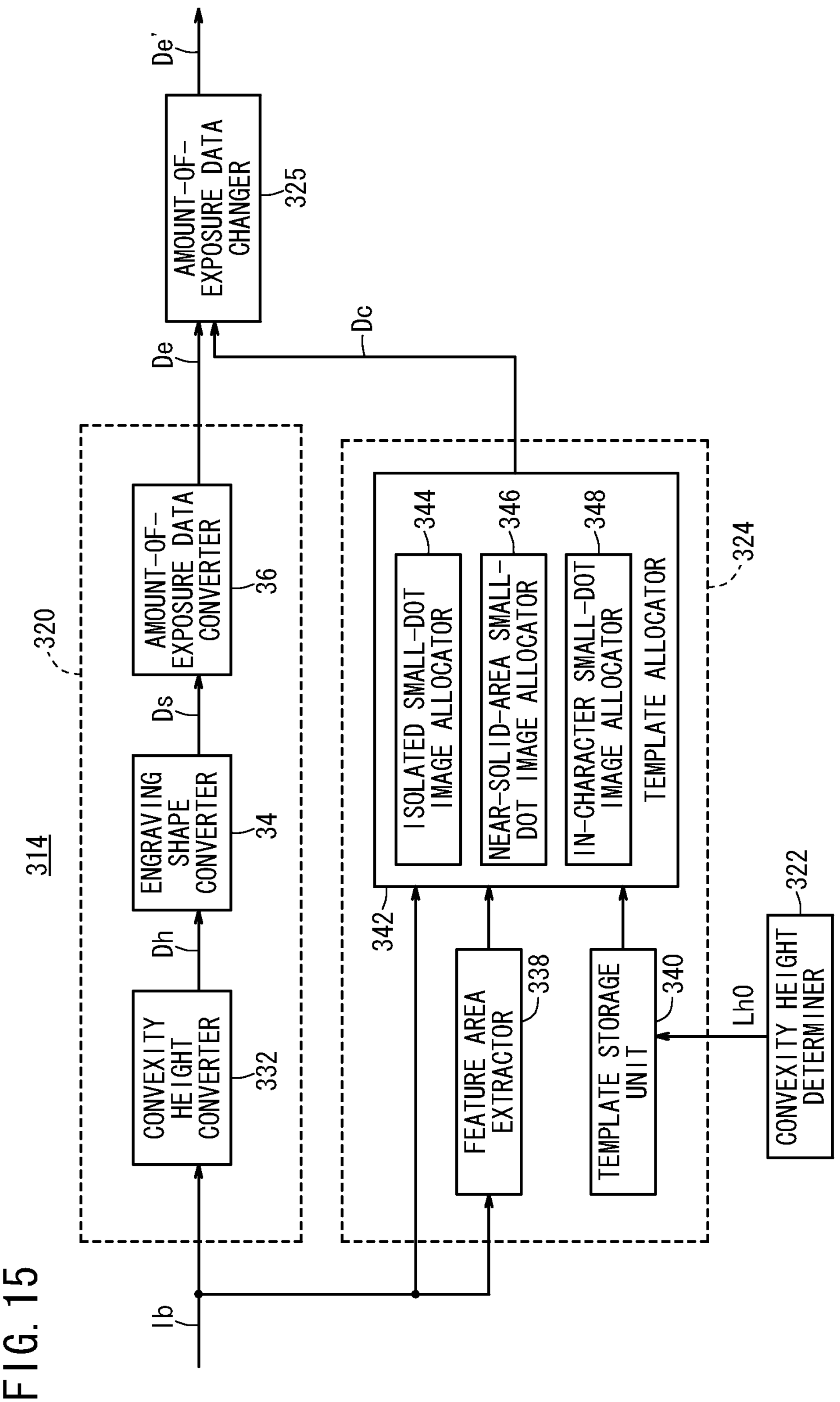
FIG. 15 is a functional block diagram of an amount-of-exposure data generator, a changing data generator, and an amount-of-exposure data changer shown in FIG. 14.

FIG. 15 is a functional block diagram of the amount-of-exposure data generator 320 and the changing data generator 324 shown in FIG. 14.

The amount-of-exposure data generator 320 comprises a convexity height converter 332 for converting binary image data Ib supplied from the RIP 312 into convexity height data Dh, an engraving shape converter 34 for converting the convexity height data Dh into engraving shape data Ds, and an amount-of-exposure data converter 36 for converting the engraving shape data Ds into amount-of-exposure data De.

The convexity height converter 332 differs from the convexity height converter 32 shown in FIGS. 4 and 8 according to the first embodiment, in that the convexity height converter 332 does not determine heights of halftone dot convexities 204 using height conversion matrices Mh (see FIGS. 5A through 5C).

The changing data generator 324 comprises a feature area extractor 338 for extracting a prescribed feature area, e.g., an image area representative of a small-dot image of the screen tint region A (see FIG. 3), from the binary image data Ib supplied from the RIP 312, a template storage unit 340 for storing template images, e.g., small-dot images, depending on the maximum height difference Lh0 supplied from the convexity height converter 332, and a template allocator 342 for determining allocated positions of various template images and for generating changing data Dc for changing the amount-of-exposure data De.

The template allocator 342 includes an isolated small-dot image allocator 344, a near-solid-area small-dot image allocator 346, and an in-character small-dot image allocator 348.

Figure 16A:
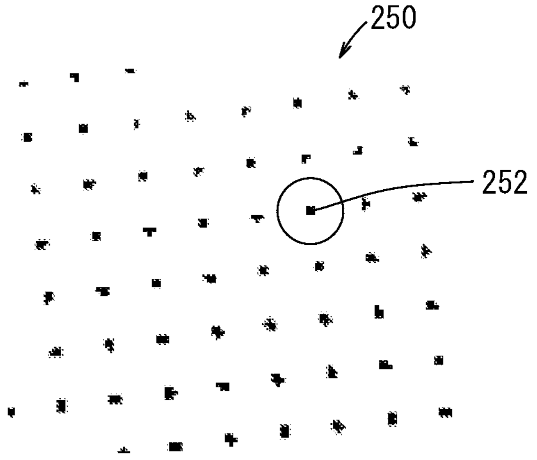
FIG. 16A is a view showing an isolated small-dot image.
Figure 16B:
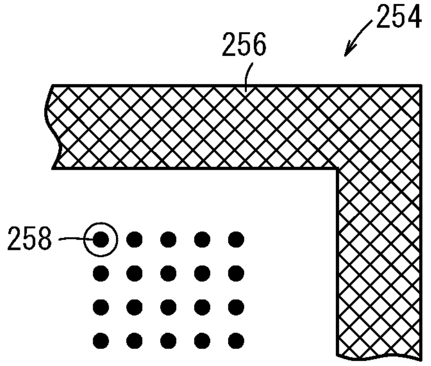
FIG. 16B is a view showing a small-dot image proximate to a solid area.
Figure 16C:
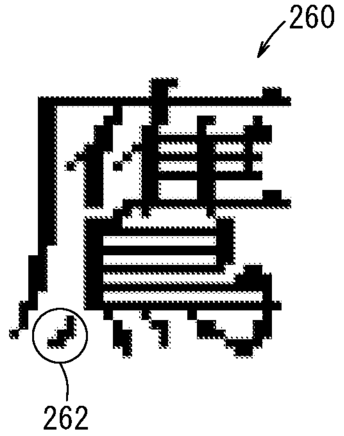
FIG. 16C is a view showing a small-dot image within a character.

The feature area extractor 338 extracts an image area having a predetermined feature from the binary image data Ib. For example, the feature area extractor 338 extracts an image area in which the small dots shown in FIGS. 16A through 16C are allocated. The term "small dot" refers to a cluster of interconnected pixels that are ON (i.e., have a pixel value of 1), wherein the cluster has a size represented by a small number of pixels. For example, a cluster of 1 to 10 pixels is referred to as a small dot. The type (attribute) of small dot is defined in advance depending on the feature of an image area around the allocated small dot.

As shown in FIG. 16A, a small dot 252 in an image 250, which is free of clusters therearound, is referred to as an "isolated small dot". As shown in FIG. 16B, a small dot 258 in an image 254, which is near a large cluster (a high-density solid image 256), is referred to as a "near-solid-area small dot". As shown in FIG. 16C, a small dot 262 in an image 260, which is neither an isolated small dot nor a near-solid-area small dot, but rather which makes up an element of a character, is referred to as an "in-character small dot".

The feature area extractor 338 performs respective image determining processes 1 through 3, as shown in FIG. 17, on each pixel of the binary image data Ib, and extracts image areas according to the results of the image determining processes 1 through 3.

The image determining process 1 is performed in a range of 9 pixels (a small size of 3×3 pixels) around a pixel to be determined (referred to as a "target pixel"). More specifically, the feature area extractor 338 calculates an average pixel value in a range of the small size, and determines whether or not a difference between pixel values of the target pixel and the average pixel value is equal to or greater than a preset first threshold.

The image determining process 2 is performed in a range of 49 pixels (a medium size of 7×7 pixels) around a target pixel. More specifically, the feature area extractor 338 counts pixel values in a range of the medium size, and determines whether or not the number of pixels having a pixel value of 1 (ON) is equal to or smaller than a preset second threshold.

The image determining process 3 is performed in a range of 225 pixels (a large size of 15×15 pixels) around a target pixel. More specifically, the feature area extractor 338 counts pixel values in a range of the large size, and determines whether or not the number of pixels having a pixel value of 1 (ON) is equal to or smaller than a preset third threshold.

If the result of the image determining process 1 is "YES", then the feature area extractor 338 judges that the target pixel makes up an element of a small dot, and performs a next image determining process. If the result of the image determining process 1 is "NO", then the feature area extractor 338 judges that the target pixel is not an element of a small dot (i.e., classifies the target pixel as "OTHERS" in FIG. 17) and terminates the image determining process.

If the result of the image determining process 2 is "YES", then the feature area extractor 338 judges that the target pixel possibly makes up an element of an isolated small dot, and performs a next image determining process. If the result of the image determining process 2 is "NO", then the feature area extractor 338 performs a next image determining process for confirming the attribute of the small dot.

Finally, if the result of the image determining process 2 is "YES" and the result of the image determining process 3 is "YES", then the feature area extractor 338 judges that the target pixel possibly makes up an element of an isolated small dot. If the result of the image determining process 2 is "YES" and the result of the image determining process 3 is "NO", then the feature area extractor 338 judges that the target pixel belongs to "OTHERS" and is not an element of a small dot.

If the result of the image determining process 2 is "NO" and the result of the image determining process 3 is "YES", then the feature area extractor 338 judges that the target pixel possibly makes up an element of an in-character small dot. If the result of the image determining process 2 is "NO" and the result of the image determining process 3 is "NO", then the feature area extractor 338 judges that the target pixel possibly makes up an element of a near-solid-area small dot.

The feature area extractor 338 thus classifies the target pixel as a pixel of an isolated small dot, a near-solid-area small dot, an in-character small dot, or OTHERS, and then extracts the image area of a small dot (an isolated small dot, a near-solid-area small dot, or an in-character small dot).

Alternatively, the feature area extractor 338 may determine a two-dimensional distribution of the positions of "isolated small dots", and determine in detail whether the target pixel belongs to an independent small dot or to a small dot in a screen tint image region within a highlighted area. If the target pixel is judged as belonging to a small dot in a screen tint image region, then amount-of-exposure data depending on a plurality of height levels may periodically be assigned according to the same arithmetic process used with respect to the height conversion matrices Mh (see FIGS. 5A through 5C).

The template allocator 342 generates changing data Dc according to the same data definition (definition of addresses and pixel values) as the amount-of-exposure data De. The template storage unit 340 stores various template images of small dots. The template allocator 342 selects a template depending on a shape or attribute of the extracted small dot, and allocates the changing data Dc to addresses depending on the position of the image area.

Then, the amount-of-exposure data changer 325 changes the amount-of-exposure data De into amount-of-exposure data De' based on the changing data Dc. Processes of changing the amount-of-exposure data will be described below, by way of example, with reference to FIGS. 18A through 19.

According to a first process, amount-of-exposure data are replaced by overwriting. It is assumed that the amount-of-exposure data generator 320 generates the amount-of-exposure data De shown in FIG. 18A from binary image data Ib representative of one isolated small dot, and that the changing data generator 324 generates the changing data Dc shown in FIG. 18B. The template image of the small dot comprises 5 pixels, which are to be located centrally among the 25 pixels shown in FIG. 18A.

The amount-of-exposure data changer 325 replaces the respective values of the 5 pixels shown in FIG. 18A with the template image shown in FIG. 18B, thereby converting (changing) the amount-of-exposure data De into new amount-of-exposure data De'. More specifically, the data surrounded by an image area 264 are replaced (see FIG. 18C).

According to a second process, amount-of-exposure data are synthesized. The second process is capable of preventing data discontinuities from occurring after the replacement of a template image, i.e., an artifact (pseudo-profile).

Figure 19:
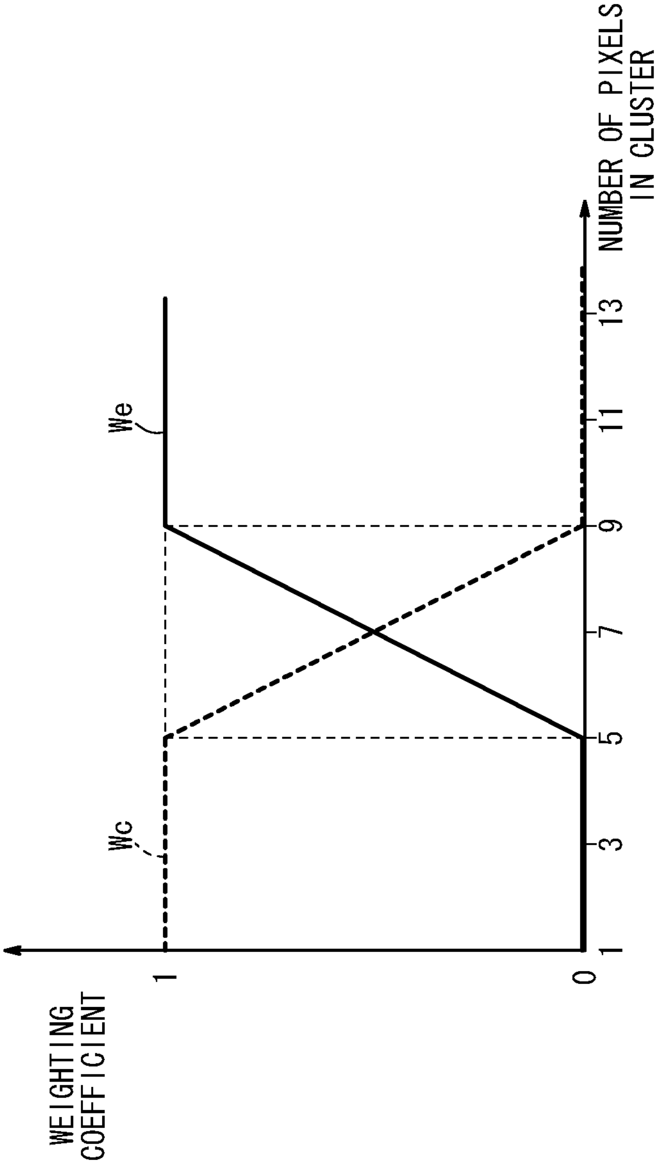
FIG. 19 is a graph showing an example of numerical values for weighting coefficients used in a weighting operation, which is performed by the amount-of-exposure data changer shown in FIG. 15.

Rather than alternatively selecting the amount-of-exposure data De and the changing data Dc, values of both data may be used to calculate the amount-of-exposure data De'. For example, as shown in FIG. 19, weighting coefficients We, We may be determined in advance depending on the number of pixels in a cluster, and new amount-of-exposure data De' may be calculated with respect to each pixel in a small-dot area, according to the following equation (2):

$$De' = We \cdot De + Wc \cdot Dc \quad (2)$$

According to this approach, even an image, e.g., a gradation image, halftone dot area ratios Har of which are close to each other, is less liable to suffer gradation discontinuities, and hence is made free of artifacts.

Figure 20:
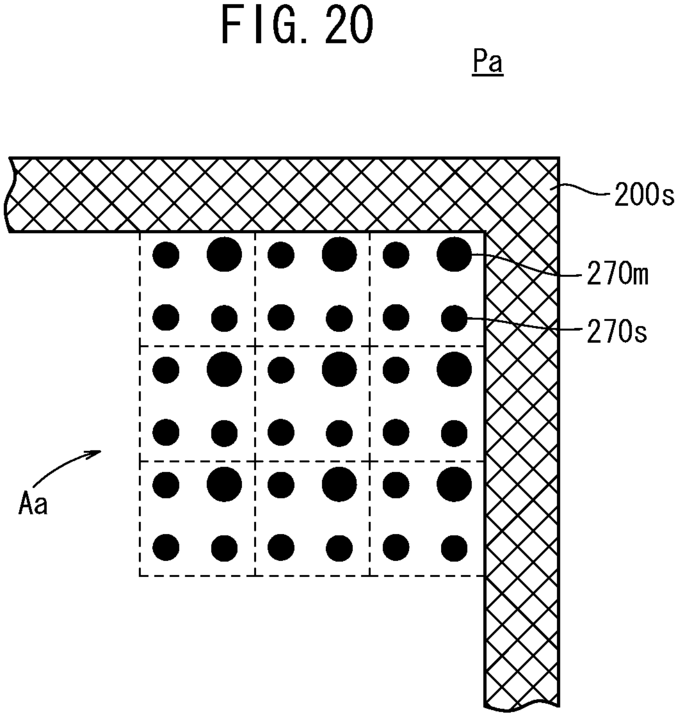
FIG. 20 is a view showing an image formed on a print by a printing relief plate, which is produced by a printing relief plate producing method according to the second embodiment of the present invention.

FIG. 20 is a view showing an image formed on a print Pa. The image shown in FIG. 20 comprises an image of a solid area 200*s*, which is shown in crosshatching, that is printed by the solid area 200 (see FIG. 3), as well as an image of an area Aa, the halftone dot area ratios Har of which are identical to each other below 10%.

In the image shown in FIG. 20, an image of the area Aa, the halftone dot area ratios Har of which are identical to each other, comprises a regular pattern made up of main halftone dots 270*m* printed by main halftone dot convexities 204*m* having the first-level halftone dot height Lh1, and halftone dots 270*s* printed by halftone dot convexities 204*s* having the second-level halftone dot height Lh2, as described above with respect to the printing relief plate C shown in FIG. 3.

On the print Pa thus produced, the main halftone dots 270*m* and the halftone dots 270*s* are prevented from becoming locally expanded unduly within the area Aa, which corresponds to a highlighted gradation of the image. Also, a printing failure near the solid area 200*s* is prevented from occurring due to the layout of the main halftone dots 270*m*.

According to the second embodiment, as described above, amount-of-exposure data De are generated based on binary image data Ib, and changing data Dc for changing the height of each halftone dot convexity 204 are generated based on the binary image data Ib. In order to produce a printing relief plate C, which contains halftone dot convexities 204 of different height levels within a screen tint region A, which is formed based on the generated amount-of-exposure data De, the amount-of-exposure data De are changed by the generated changing data Dc, and a flexographic printing plate material F is exposed to a laser beam L based on the changed amount-of-exposure data De'. Consequently, it is possible to produce a printing relief plate C in which halftone dot convexities 204 having different height levels are arranged appropriately. The printing relief plate C thus generated is capable of transferring ink to a print medium to achieve a target density. Accordingly, various images including small-dot image areas can be printed while maintaining a stable printing density.

Various modifications of the present invention will be described below.

In FIG. 13A, the halftone dot convexities 204 have identical shapes (e.g., circular shapes) as viewed in plan. However, the halftone dot convexities 204 may have different radii at different height levels, or may have different shapes, such as an elliptical shape or the like, as viewed in plan.

In FIG. 2, heights of the halftone dot convexities 204 are provided in three levels. However, if required, the halftone dot convexities 204 may have heights that are greater than or less then three levels. The conversion characteristic curves 100 of each of the halftone dot cells Hc may also be changed in various ways.

In FIGS. 5A through 5C, the height conversion matrices Mh have a size of 8×8 pixels. However, the height conversion matrices Mh may be smaller or greater in size.

In the above embodiments, concentrated halftone dots are employed according to a so-called dithering process, which are AM halftone dots (halftone dots according to an AM screen) in which one halftone dot is formed, the size (diameter) of which increases as the graduation value increases within each halftone dot cell Hc. However, distributed halftone dots may be employed, which are FM halftone dots (halftone dots according to an FM screen) in which halftone dots in a halftone dot cell Hc have a constant size (diameter), and wherein the density of the halftone dots in the halftone dot cell Hc increases as the graduation value increases.

If an FM screen is employed, then blue-noise mask threshold data, comprising about 256×256 thresholds in which low-frequency components are removed as much as possible and dots of which are uniformly distributed, are stored as threshold data Td. With such blue-noise mask threshold data, granularity is made less visible, and periodic patterns are prevented from being produced.

In the above embodiments, halftone dots the screen angle of which is 0 degrees have been illustrated. However, it is known in the art that for performing color printing with relief plates, such as flexographic printing, 0-degree halftone dots are used, the C, M, Y, K screen angles of which are 0 degrees, 15 degrees, 45 degrees, and 75 degrees. Alternatively, 7.5-degree-shifted halftone dots may be used, the C, M, Y, K screen angles of which are 7.5 degrees, 22.5 degrees, 52.5 degrees, and 82.5 degrees. According to the present invention, halftone dots having screen angles other than 0 degrees are capable of achieving a print quality having better gradation, and which is free of defects such as irregularities.

Figure 21:
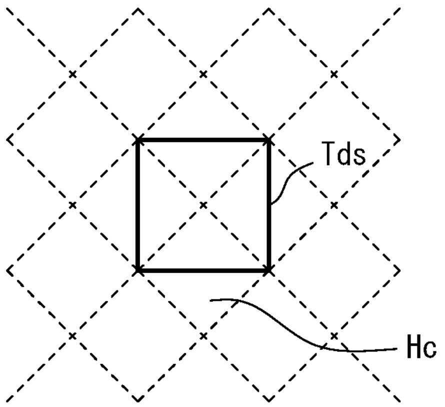
FIG. 21 is a diagram showing the relationship between threshold data and the size of halftone dot cells at a screen angle of 45°.
Figure 22B:
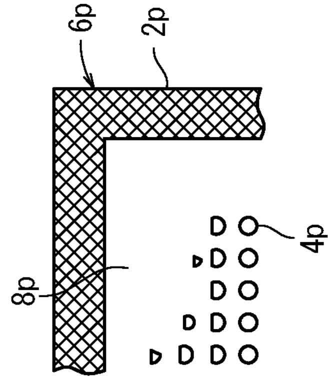
FIG. 22B is a view showing an image printed using the printing relief plate according to the related art.
Figure 22A:
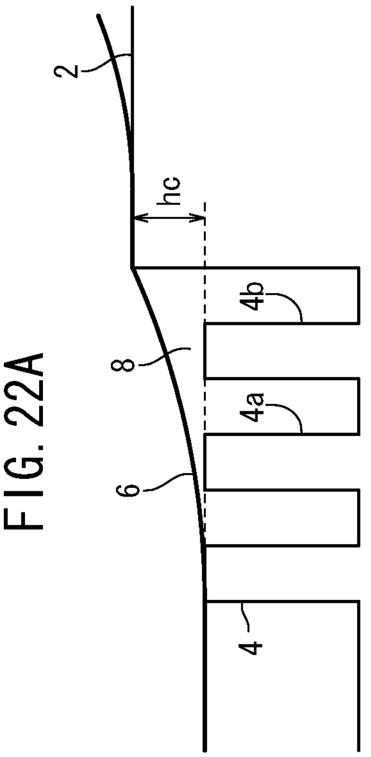
FIG. 22A is a view showing a printing relief plate according to the related art.

For halftone dots the screen angle of which is not 0 degrees, but rather is 15 degrees, 45 degrees, 75 degrees, 7.5 degrees, 22.5 degrees, 52.5 degrees, or 82.5 degrees, the size of the halftone dot cell Hc and the size of the threshold data Td may not be identical to each other. Rather, in an example in which the screen angle is 45 degrees, as shown in FIG. 21, the threshold data Td may comprise threshold data Tds of one large super cell, which corresponds to a plurality of halftone dot cells Hc (two halftone dot cells Hc in FIG. 21).

Although certain preferred embodiments of the present invention have been shown and described in detail, it should be understood that various changes and modifications may be made to the embodiments without departing from the scope of the invention as set forth in the appended claims.

What is claimed is:

1. A printing relief plate producing apparatus for producing a printing relief plate having a plurality of halftone dot convexities disposed on a surface of a printing plate material, for printing halftone dots on a print medium by transferring ink to the print medium, comprising:

a binary image data generator for generating binary image data based on multivalued image data representative of a printed image;

a height data generator for generating height data for determining heights of the halftone dot convexities based on the multivalued image data; and an amount-of-exposure data generator for generating amount-of-exposure data associated with amounts of exposure to the printing plate material, based on the height data generated by the height data generator and the binary image data, in order to produce a printing relief plate in which the halftone dot convexities have heights at a plurality of height levels within a screen tint region, which is formed based on the binary image data generated by the binary image data generator.

2. The printing relief plate producing apparatus according to claim 1, further comprising:

a convexity height determiner for determining heights of the halftone dot convexities, such that the area ratio difference, within an image area of a constant halftone dot area ratio in the screen tint region, between an average area ratio of the halftone dots printed on the print medium and the constant halftone dot area ratio, is smaller than an area ratio difference for heights of the halftone dot convexities that are identical to each other.

3. The printing relief plate producing apparatus according to claim 1, wherein the amount-of-exposure data generator comprises a convexity height converter for converting pixel values of the binary image data into heights of the halftone dot convexities, based on halftone dot area ratios depending on pixels of the binary image data and the height data, which are associated in advance with the halftone dot area ratios.

4. The printing relief plate producing apparatus according to claim 3, wherein the height data comprise a matrix associated in advance with a positional relation to the height levels and not exceeding the size of the binary image data; and the convexity height converter periodically associates pixel values of the binary image data with the height data, by periodically arranging the matrix in an image area of the binary image data.

5. The printing relief plate producing apparatus according to claim 4, wherein the matrix is determined such that main halftone dot convexities having a maximum height level of the height levels are not disposed adjacent to each other.

6. The printing relief plate producing apparatus according to claim 3, wherein the height data are determined so as to be constant at a prescribed halftone dot area ratio or greater, and so as to decrease as the halftone dot area ratio decreases below the prescribed halftone dot area ratio.

7. The printing relief plate producing apparatus according to claim 4, wherein the matrix has a size equal to an integral multiple of the size of a threshold matrix for converting the multivalued image data into the binary image data.

8. The printing relief plate producing apparatus according to claim 1, further comprising:

an exposure unit for exposing the printing plate material to a light beam, based on the amount-of-exposure data generated by the amount-of-exposure data generator.

9. The printing relief plate producing apparatus according to claim 1, wherein the height levels include at least three levels.

10. A printing relief plate producing apparatus for producing a printing relief plate having a plurality of halftone dot convexities disposed on a surface of a printing plate material, for printing halftone dots on a print medium by transferring ink to the print medium, comprising:

an amount-of-exposure data generator for generating amount-of-exposure data associated with an amount of exposure to the printing plate material, based on binary image data representative of a printed image;

a changing data generator for generating changing data for changing heights of the halftone dot convexities based on the binary image data;

an amount-of-exposure data changer for changing the amount-of-exposure data based on the changing data generated by the changing data generator, in order to produce a printing relief plate in which the halftone dot convexities have heights at a plurality of height levels within a screen tint region, which is formed based on the amount-of-exposure data generated by the amount-of-exposure data generator; and an exposure unit for exposing the printing plate material to a light beam, based on the amount-of-exposure data changed by the amount-of-exposure data changer.

11. The printing relief plate producing apparatus according to claim 10, wherein the changing data generator comprises:

a feature area extractor for extracting, as a small dot from an image area of the binary image data within the screen tint region, an image area in which the number of adjacent pixels, which are in an ON state, is equal to or less than a predetermined number; and a template allocator for allocating a prescribed template image in an image area of the small dot extracted by the feature area extractor, to thereby generate the changing data.

12. The printing relief plate producing apparatus according to claim 11, wherein the changing data generator further includes a template storage unit for storing the template image depending on a shape or attribute of the small dot.

13. The printing relief plate producing apparatus according to claim 11, wherein the amount-of-exposure data changer produces a value, as new amount-of-exposure data, by weighting and adding the amount-of-exposure data from the amount-of-exposure data generator and the changing data from the changing data generator, using weighting coefficients depending on the number of pixels within the image area of the small dot.

14. The printing relief plate producing apparatus according to claim 10, wherein the height levels include at least three levels.

15. A printing relief plate producing system for producing a printing relief plate having a plurality of halftone dot convexities disposed on a surface of a printing plate material, for printing halftone dots on a print medium by transferring ink to the print medium, comprising:

a RIP for generating binary image data based on multivalued image data representative of a printed image; and a printing relief plate producing apparatus for producing the printing relief plate by exposing the printing plate material to a light beam, based on the binary image data generated by the RIP;

wherein the printing relief plate producing apparatus comprises:

an amount-of-exposure data generator for generating amount-of-exposure data associated with an amount of exposure to the printing plate material based on the binary image data;

a changing data generator for generating changing data for changing heights of the halftone dot convexities based on the binary image data;

an amount-of-exposure data changer for changing the amount-of-exposure data based on the changing data generated by the changing data generator, in order to produce a printing relief plate in which the halftone dot convexities have heights at a plurality of height levels within a screen tint region, which is formed based on the amount-of-exposure data generated by the amount-of-exposure data generator; and an exposure unit for exposing the printing plate material to a light beam, based on the amount-of-exposure data changed by the amount-of-exposure data changer.

16. A method of producing a printing relief plate having a plurality of halftone dot convexities disposed on a surface of a printing plate material, for printing halftone dots on a print medium by transferring ink to the print medium, comprising the steps of:

generating binary image data based on multivalued image data representative of a printed image;

generating height data for determining heights of the halftone dot convexities based on the multivalued image data;

generating amount-of-exposure data based on the generated height data and the binary image data, in order to produce a printing relief plate in which the halftone dot convexities have heights at a plurality of height levels within a screen tint region, which is formed based on the generated binary image data; and exposing the printing plate material to a light beam based on the generated amount-of-exposure data.

17. A method of producing a printing relief plate having a plurality of halftone dot convexities disposed on a surface of a printing plate material, for printing halftone dots on a print medium by transferring ink to the print medium, comprising the steps of:

generating amount-of-exposure data associated with an amount of exposure to the printing plate material, based on binary image data representative of a printed image;

generating changing data for changing heights of the halftone dot convexities based on the binary image data;

changing the amount-of-exposure data based on the generated changing data, in order to produce a printing relief plate in which the halftone dot convexities have heights at a plurality of height levels within a screen tint region, which is formed based on the generated amount-of-exposure data; and exposing the printing plate material to a light beam based on the changed amount-of-exposure data.

18. A non-transitory recording medium storing therein a program for enabling a computer to generate amount-of-exposure data associated with an amount of exposure to a printing plate material, in order to produce a printing relief plate having a plurality of halftone dot convexities disposed on a surface of a printing plate material, for printing halftone dots on a print medium by transferring ink to the print medium, wherein the program enables the computer to function as:

a binary image data generator for generating binary image data based on multivalued image data representative of a printed image;

a height data generator for generating height data for determining heights of the halftone dot convexities based on the multivalued image data; and an amount-of-exposure data generator for generating amount-of-exposure data associated with amounts of exposure to the printing plate material, based on the height data generated by the height data generator and the binary image data, in order to produce a printing relief plate in which the halftone dot convexities have heights at a plurality of height levels within a screen tint region, which is formed based on the binary image data generated by the binary image data generator.

19. A non-transitory recording medium storing therein a program for enabling a computer to generate amount-of-exposure data associated with an amount of exposure to a printing plate material, in order to produce a printing relief plate having a plurality of halftone dot convexities disposed on a surface of a printing plate material, for printing halftone dots on a print medium by transferring ink to the print medium, wherein the program enables the computer to function as:

an amount-of-exposure data generator for generating amount-of-exposure data associated with an amount of exposure to the printing plate material based on binary image data representative of a printed image;

a changing data generator for generating changing data for changing heights of the halftone dot convexities based on the binary image data; and an amount-of-exposure data changer for changing the amount-of-exposure data based on the changing data generated by the changing data generator, in order to produce a printing relief plate in which the halftone dot convexities have heights at a plurality of height levels within a screen tint region, which is formed based on the amount-of-exposure data generated by the amount-of-exposure data generator.

* * * * *